US012564192B2

(12) United States Patent
Jin et al.

(10) Patent No.: US 12,564,192 B2
(45) Date of Patent: Mar. 3, 2026

(54) HERBICIDAL AGENT COMPOSITION AND WEED CONTROL METHOD

(71) Applicant: SUMITOMO CHEMICAL COMPANY, LIMITED, Chuo-ku (JP)

(72) Inventors: Yoshinobu Jin, Kasai (JP); Akihiro Tomita, Chuo-ku (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 766 days.

(21) Appl. No.: 17/638,649

(22) PCT Filed: Aug. 27, 2020

(86) PCT No.: PCT/JP2020/032324
§ 371 (c)(1),
(2) Date: Feb. 25, 2022

(87) PCT Pub. No.: WO2021/039893
PCT Pub. Date: Mar. 4, 2021

(65) Prior Publication Data

US 2022/0322666 A1 Oct. 13, 2022

(30) Foreign Application Priority Data

Aug. 29, 2019 (JP) ................................. 2019-156454

(51) Int. Cl.
*A01N 43/54* (2006.01)

(52) U.S. Cl.
CPC .................................... *A01N 43/54* (2013.01)

(58) Field of Classification Search
CPC ........ A01N 43/54; A01N 43/80; A01N 43/84; A01N 25/04; A01N 25/06; A01N 57/20; A01P 13/02
See application file for complete search history.

(56) References Cited

U.S. PATENT DOCUMENTS

2019/0142005 A1* 5/2019 Sada ...................... A01N 33/04
504/128

FOREIGN PATENT DOCUMENTS

JP 2019-516755 A 6/2019
WO WO 2017/202768 A1 11/2017
(Continued)

OTHER PUBLICATIONS

International Search Report issued Sep. 29, 2020, in PCT/JP2020/032324, 2 pages.
(Continued)

*Primary Examiner* — Erin E Hirt
*Assistant Examiner* — Ali S Saeed
(74) *Attorney, Agent, or Firm* — Oblon, McClelland, Maier & Neustadt, L.L.P.

(57) ABSTRACT

Provided are a herbicidal composition and a method for controlling weeds that have a superior weed controlling effect. The present herbicidal composition comprises one or more uracil compounds selected from the group consisting of a compound represented by formula (I) and a compound represented by formula (II), and one or more compounds selected from the group consisting of the herbicide compound group B and the safener group C, wherein a weight ratio of the uracil compounds to one or more compounds selected from the group consisting of the herbicide compound group B and the safener group C is 1:0.02 to 1:50, and the herbicide compound group B is the group consisting of the following B-1 to B-12 below: B-1, acetolactate synthase inhibitors; B-2, acetyl CoA carboxylase inhibitors; B-3, protoporphyrinogen IX oxidase inhibitors; B-4, 4-hydrophenylpyrubic acid dioxygenase inhibitors; B-5, phytoene desaturase inhibitors; B-6, photosystem II inhibitors; B-7, very-long-chain fatty acid synthesis inhibitors; B-8, microtubule formation inhibitors; B-9, auxin-type herbicides; B-10, enolpyruvylshikimate-3-phosphate synthase inhibitors; B-11, glutamine synthase inhibitors; and B-12, other herbicides; (including agriculturally acceptable salts or derivatives thereof).

(I)

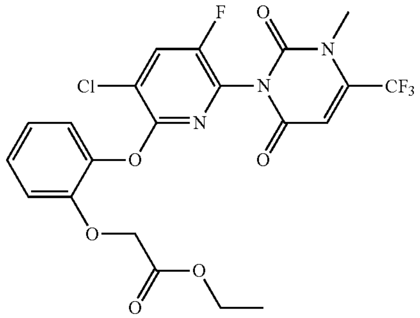

(II)

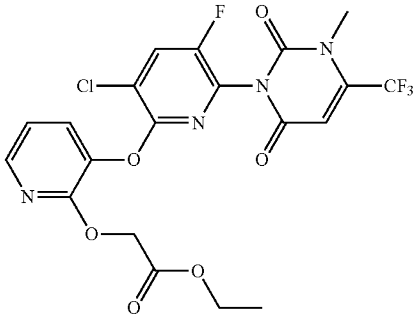

2 Claims, No Drawings

(56) References Cited

FOREIGN PATENT DOCUMENTS

| | | | | | |
|---|---|---|---|---|---|
| WO | WO-2018016641 | A1 * | 1/2018 | ............. | A01N 33/04 |
| WO | WO 2019/030098 | A1 | 2/2019 | | |
| WO | WO 2019/101533 | A1 | 5/2019 | | |
| WO | WO 2019/106568 | A1 | 6/2019 | | |

OTHER PUBLICATIONS

International Preliminary Report on Patentability and Written Opinion issued Mar. 1, 2022, in PCT/JP2020/032324, 4 pages.

* cited by examiner

HERBICIDAL AGENT COMPOSITION AND WEED CONTROL METHOD

CROSS-REFERENCE TO RELATED APPLICATIONS

The present application is a 35 U.S.C. § 371 national stage patent application of International patent application PCT/JP2020/032324, filed on Aug. 27, 2020, which is based on and claims the benefits of priority to Japanese Application No. 2019-156454, filed on Aug. 29, 2019. The entire contents of these applications are incorporated herein by reference.

TECHNICAL FIELD

The present invention relates to a herbicidal composition and a method for controlling weeds.

BACKGROUND ART

At present, many herbicides are commercially available and used. Many PPO-inhibiting herbicides have been used for the purpose of controlling weeds, and, for example, uracil compounds having herbicidal activity have been known as an active ingredient for the PPO-inhibiting herbicides.

CITATION LIST

Patent Document

Patent Document 1: WO 2017/202768 A1
Patent Document 2: WO 2019/101533 A1
Patent Document 3: WO 2019/106568 A1

SUMMARY OF THE INVENTION

Problems to be Solved by Invention

An object of the present invention is to provide a herbicidal composition having excellent control effect on weeds and a method for controlling weeds.

Means to Solve Problems

The present inventors have found that excellent control effect on weeds is exerted by using one or more uracil compounds selected from the group consisting of a compound represented by the following formula (I) and a compound represented by the following formula (II) in combination with a specific compound.

The present invention includes the following aspects.

[1] A herbicidal composition comprising one or more uracil compounds selected from the group consisting of a compound represented by formula (I):

(I)

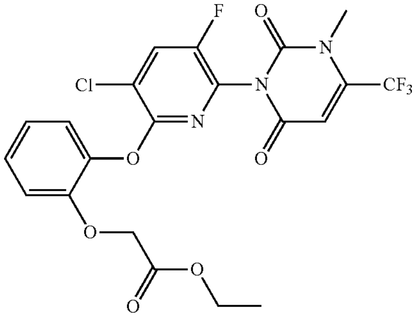

and a compound represented by formula (II):

(II)

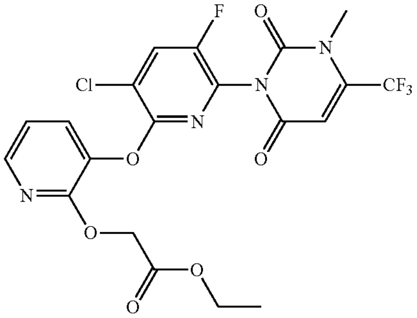

and one or more compounds selected from the group consisting of the herbicide compound group B and the safener group C, wherein a weight ratio of the uracil compounds to one or more compounds selected from the group consisting of the herbicide compound group B and the safener group C is within a range of 1:0.02 to 1:50, and the herbicide compound group B is the group consisting of the following B-1 to B-12:

B-1, acetolactate synthase inhibitors;
B-2, acetyl CoA carboxylase inhibitors;
B-3, protoporphyrinogen IX oxidase inhibitors;
B-4, 4-hydrophenylpyrubic acid dioxygenase inhibitors;
B-5, phytoene desaturase inhibitors;
B-6, photosystem II inhibitors;
B-7, very-long-chain fatty acid synthesis inhibitors;
B-8, microtubule formation inhibitors;
B-9, auxin-type herbicides;
B-10, enolpyruvylshikimate-3-phosphate synthase inhibitors;
B-11, glutamine synthase inhibitors; and
B-12, other herbicides; (including agriculturally acceptable salts or derivatives thereof).

[2] The herbicidal composition according to [1], wherein the B-1 is the group consisting of: pyrithiobac, pyrithiobac-sodium salt, pyriminobac, pyriminobac-methyl, bispyribac, bispyribac-sodium salt, pyribenzoxim, pyrimisulfan, pyriftalid, triafamone, amidosulfuron, azimsulfuron, bensulfuron, bensulfuron-methyl, chlorimuron, chlorimuron-ethyl, cyclosulfamuron, ethoxysulfuron, flazasulfuron, flucetosulfuron, flupyrsulfuron, flupyrsulfuron methyl-sodium, foramsulfuron, halosulfuron, halosulfuron-methyl, imazosulfuron, mesosulfuron, mesosulfuron-methyl, metazosulfuron, nicosulfuron, orthosulfamuron, oxasulfuron, primisulfuron, primisulfuron-methyl, propyrisulfuron, pyrazosulfuron, pyrazosulfuron-ethyl, rimsulfuron, sulfometuron, sulfometuron-methyl, sulfosulfuron, trifloxysulfuron, trifloxysulfuron-sodium salt, chlorsulfuron, cinosulfuron, ethametsulfuron, ethametsulfuron-methyl, iodosulfuron, iodosulfuron-methyl-sodium, iofensulfuron, iofensulfuron-sodium, metsulfuron, metsulfuron-methyl, prosulfuron, thifensulfuron, thifensulfuron-methyl, triasulfuron, tribenuron, tribenuron-methyl, triflusulfuron, triflusulfuron-methyl, tritosulfuron, bencarbazone, flucarbazone, flucarbazone-sodium salt, propoxycarbazone, propoxycarbazone-sodium salt, thiencarbazone, thiencarbazone-methyl, cloransulam, cloransulam-methyl, diclosulam, florasulam, flumetsulam, metosulam, penoxsulam, pyroxsulam, imazamethabenz, imazamethabenz-methyl, imazamox, imazamox-ammonium salt, imazapic, imazapic-ammonium salt, imazapyr, imazapyr-isopropylammonium salt, imazaquin, imazaquin-ammonium, imazethapyr and imazethapyr-ammonium salt (including agriculturally acceptable salts or derivatives thereof), the B-2 is the group consisting of: clodinafop, clodinafop-propargyl, cyhalofop, cyhalofop-butyl, diclofop, diclofop-methyl, fenoxaprop, fenoxaprop-ethyl, fenoxaprop-P, fenoxaprop-P-ethyl, fluazifop, fluazifop-butyl, fluazifop-P, fluazifop-P-butyl, haloxyfop, haloxyfop-methyl, haloxyfop-P, haloxyfop-P-methyl, metamifop, propaquizafop, quizalofop, quizalofop-ethyl, quizalofop-P, quizalofop-P-ethyl, alloxydim, clethodim, sethoxydim, tepraloxydim, tralkoxydim and pinoxaden (including agriculturally acceptable salts or derivatives thereof), the B-3 is the group consisting of: azafenidin, oxadiazone, oxadiargyl, carfentrazone, carfentrazone-ethyl, saflufenacil, cinidon, cinidon-ethyl, sulfentrazone, pyraclonil, cyclopyranil, pyraflufen, pyraflufen-ethyl, butafenacil, fluazolate, fluthiacet, fluthiacet-methyl, flufenpyr, flufenpyr-ethyl, flumiclorac, flumiclorac-pentyl, flumioxazin, pentoxazone, oxyfluorfen, acifluorfen, acifluorfen-sodium salt, aclonifen, chlomethoxynil, chloronitrofen, nitrofen, bifenox, fluoroglycofene, fluoroglycofene-ethyl, fomesafen, fomesafen-sodium salt, lactofen, tiafenacil, trifludimoxazin and ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (including agriculturally acceptable salts or derivatives thereof), the B-4 is the group consisting of: benzobicyclon, bicyclopyrone, mesotrione, sulcotrione, tefuryltrione, tembotrione, isoxachlorotole, isoxaflutole, benzofenap, pyrasulfotole, pyrazolynate, pyrazoxyfen, fenquinotrione, topramezone, tolpyralate, lancotrione, lancotrione-sodium salt, 2-methyl-N-(5-methyl-1,3,4-oxadiazol-2-yl)-3-(methylsulfonyl)-4-(trifluoromethyl)benzamide (CAS registry No.: 1400904-50-8), 2-chloro-N-(1-methyl-1H-tetrazol-5-yl)-3-(methylthio)-4-(trifluoromethyl)benzamide (CAS registry No.: 1361139-71-0) and 4-(4-fluorophenyl)-6-[(2-hydroxy-6-oxo-1-cyclohexen-1-yl)carbonyl]-2-methyl-1,2,4-triazine-3,5(2H,4H)-dione (CAS registry No.: 1353870-34-4) (including agriculturally acceptable salts or derivatives thereof), the B-5 is the group consisting of: diflufenican, picolinafen, beflubutamid, norflurazon, fluridone, flurochloridone and flurtamone (including agriculturally acceptable salts or derivatives thereof), the B-6 is the group consisting of: ioxynil, ioxynil octanoate, bentazone, pyridate, bromoxynil, bromoxynil octanoate, chlorotoluron, dimefuron, diuron, linuron, fluometuron, isoproturon, isouron, tebuthiuron, benzthiazuron, methabenzthiazuron, propanil, metobromuron, metoxuron, monolinuron, siduron, simazine, atrazine, propazine, cyanazine, ametryne, simetryn, dimethametryn, prometryn, terbumeton, terbuthylazine, terbutryn, trietazine, hexazinone, metamitron, metribuzin, amicarbazone, bromacil, lenacil, terbacil, chloridazon, desmedipham and phenmedipham (including agriculturally acceptable salts or derivatives thereof), the B-7 is the group consisting of: propachlor, metazachlor, alachlor, acetochlor, metolachlor, S-metolachlor, butachlor, pretilachlor, thenylchlor, indanofan, cafenstrole, fentrazamide, dimethenamid, dimethenamid-P, mefenacet, pyroxasulfone, fenoxasulfone, naproanilide, napropamide, anilofos, flufenacet and ipfencarbazone (including agriculturally acceptable salts or derivatives thereof), the B-8 is the group consisting of: trifluralin, pendimethalin, ethalfluralin, benfluralin, oryzalin, prodiamine, butamifos, dithiopyr and thiazopyr (including agriculturally acceptable salts or derivatives thereof), the B-9 is the group consisting of: 2,4-D and a salt or ester thereof (tetrabutylammonium salt, biproamine, doboxyl, 2-ethylhexyl, 3-butoxypropyl, ammonium, butotyl, butyl, diethylammonium, dimethylammonium, diolamine salt, dodecylammonium, ethyl, heptylammonium, isobutyl, isooctyl, isopropyl, isopropylammonium, lithium salt, meptyl, methyl, octyl, pentyl, propyl, sodium salt, tefuryl, tetradecylammonium, triethylammonium, tris (2-hydroxypropyl)ammonium, trolamine salt and choline salt), 2,4-DB and a salt or ester thereof (dimethylammonium salt, isooctyl ester and choline salt), MCPA and a salt or ester thereof (dimethylammonium salt, 2-ethylhexyl ester, isooctyl ester, sodium salt and choline salt), MCPB, mecoprop and a salt or ester thereof (dimethylammonium salt, diolamine salt, ethadyl ester, 2-ethylhexyl ester, isooctyl ester, methyl ester, potassium salt, sodium salt, trolamine salt and choline salt), mecoprop-P and a salt or ester thereof (dimethylammonium salt, 2-ethylhexyl ester, isobutyl salt, potassium salt and choline salt), dichlorprop and a salt or ester thereof (butotyl ester, dimethylammonium salt, 2-ethylhexyl ester, isooctyl ester, methyl ester, potassium salt, sodium salt and choline salt), dichlorprop-P, dichlorprop-P dimethylammonium, dicamba and a salt or ester thereof (tetrabutylammonium salt, biproamine, trolamine salt, diglycolamine salt, dimethylammonium, diolamine salt, isopropylammonium, methyl, olamine salt, potassium salt, sodium salt and choline salt), triclopyr and a salt or ester thereof (butotyl ester and triethylammonium salt), fluroxypyr, fluroxypyr-meptyl, picloram and a salt thereof (potassium salt, tris (2-hydroxypropyl)ammonium salt and choline salt), quinclorac, quinmerac, aminopyralid and a salt thereof (potassium salt, tris(2-hydroxypropyl)ammonium salt and choline salt), clopyralid and a salt thereof (olamine salt, potassium salt, triethylammonium salt and choline salt), clomeprop, aminocyclopyrachlor, halauxifen, halauxifen-methyl, florpyrauxifen and florpyrauxifen-benzyl (including agriculturally acceptable salts or derivatives thereof), the B-10 is the group consisting of: glyphosate, glyphosate-isopropylammonium salt, glyphosate-trimesium salt, glyphosate-ammonium salt, glyphosate-diammonium salt, glyphosate-dimethylammonium salt, glyphosate-monoethanolamine salt, glyphosate-sodium salt, glyphosate-potassium salt and glyphosate-guanidine salt (including agriculturally acceptable salts or derivatives thereof), the B-11 is the group consisting of: glufosinate, glufosinate-ammonium salt, glufosinate-P, glufosinate-P-sodium salt and bialaphos (including agriculturally acceptable salts or derivative thereof), and the B-12 is the group consisting of: isoxaben, dichlobenil, methiozolin, diallate, butyrate, triallate, chlorpropham, asulam, phenisopham, benthiocarb, molinate, esprocarb, pyributicarb, prosulfocarb, orbencarb, EPIC, dimepiperate, Swep, difenoxuron, methyl daimuron, bromobutide, daimuron, cumyluron, diflufenzopyr, diflufenzopyr-sodium salt, etobenzanid, tridiphane, amitrole, clomazone, bixlozone, maleic hydrazide, oxaziclomefone, cinmethylin, benfuresate, ACN, dalapon, chlorthiamid, flupoxam, bensulide, paraquat, paraquat-dichloride, diquat, diquat-dibromide, MSMA, indaziflam, triaziflam and tetflupyrolimet (including agriculturally acceptable salts or derivatives thereof).

[3] The herbicidal composition according to [1] or [2], wherein the safener group C is the group consisting of benoxacor, cloquintocet, cyometrinil, cyprosulfamide, dichlormid, dicyclonon, dietholate, fenchlorazole, fenclorim, flurazole, fluxofenim, furilazole, isoxadifen, mefenpyr, mephenate, naphthalic anhydride, oxabetrinil, 4-(dichloroacetyl)-1-oxa-4-azaspiro[4.5]decane, 2,2,5-trimethyl-3-(dichloroacetyl)-1,3-oxazolidine and N-(2-methoxybenzoyl)-4-[(methylaminocarbonyl) amino]benzenesulfon-amide (including agriculturally acceptable salts or derivatives thereof).

[4] The herbicidal composition according to [1], wherein the B-1 is the group consisting of: pyrithiobac, pyrithiobac-sodium salt, chlorimuron-ethyl, foramsulfuron, halosulfuron-methyl, nicosulfuron, primisulfuron-methyl, rimsulfuron, trifloxysulfuron-sodium salt, chlorsulfuron, iodosulfuron-methyl-sodium, iofensulfuron-sodium, metsulfuron-methyl, prosulfuron, thifensulfuron-methyl, tribenuron-methyl, thiencarbazone-methyl, cloransulam-methyl, flumetsulam, imazamethabenz-methyl, imazamox-ammonium salt, imazapic-ammonium salt, imazapyr-isopropylammonium, imazaquin-ammonium salt and imazethapyr-ammonium salt (including agriculturally acceptable salts or derivatives thereof).

[5] The herbicidal composition according to [1], wherein the B-2 is the group consisting of: fenoxaprop-ethyl, fenoxaprop-P-ethyl, fluazifop-butyl, fluazifop-P-butyl, quizalofop-ethyl, quizalofop-P-ethyl, clethodim and sethoxydim (including agriculturally acceptable salts or derivatives thereof).

[6] The herbicidal composition according to [1], wherein the B-3 is the group consisting of: carfentrazone-ethyl, saflufenacil, sulfentrazone, pyraflufen-ethyl, fluthiacet-methyl, flufenpyr-ethyl, flumiclorac-pentyl, flumioxazin, oxyfluorfen, acifluorfen-sodium salt, fomesafen-sodium salt, lactofen, tiafenacil, trifludimoxazin and ethyl [(3-{2-chloro-4-fluoro-5-[3-methyl-4-(trifluoromethyl)-2,6-dioxo-1,2,3,6-tetrahydropyrimidin-1-yl]phenoxy}pyridin-2-yl)oxy]acetate (including agriculturally acceptable salts or derivatives thereof).

[7] The herbicidal composition according to [1], wherein the B-4 is the group consisting of: bicyclopyrone, mesotrione, tembotrione, isoxaflutole, fenquinotrione, topramezone, tolpyralate, lancotrione-sodium salt, 2-methyl-N-(5-methyl-1,3,4-oxadiazol-2-yl)-3-(methylsulfonyl)-4-(trifluoromethyl)benzamide (CAS registry No. 1400904-50-8), 2-chloro-N-(1-methyl-1H-tetrazol-5-yl)-3-(methylthio)-4-(trifluoromethyl) benzamide (CAS registry No. 1361139-71-0) and 4-(4-fluorophenyl)-6-[(2-hydroxy-6-oxo-1-cyclohexen-1-yl)carbonyl]-2-methyl-1,2,4-triazine-3,5(2H,4H)-dione (CAS registry No. 1353870-34-4) (including agriculturally acceptable salts or derivatives thereof).

[8] The herbicidal composition according to [1], wherein the B-5 is the group consisting of: norflurazon and fluridone (including agriculturally acceptable derivatives thereof).

[9] The herbicidal composition according to [1], wherein the B-6 is the group consisting of: bentazone, bromoxynil octanoate, diuron, linuron, fluometuron, simazine, atrazine, ametryne, prometryn and metribuzin (including agriculturally acceptable salts or derivatives thereof).

[10] The herbicidal composition according to [1], wherein the B-7 is the group consisting of: alachlor, acetochlor, metolachlor, S-metolachlor, dimethenamid, dimethenamid-P, pyroxasulfone and flufenacet (including agriculturally acceptable derivatives thereof).

[11] The herbicidal composition according to [1], wherein the B-8 is the group consisting of: trifluralin, pendimethalin and ethalfluralin (including agriculturally acceptable derivative thereof).

[12] The herbicidal composition according to [1], wherein the B-9 is the group consisting of: 2,4-D, 2,4-D choline salt, 2,4-DB, dicamba, dicamba-biproamine, diglycolamine salt, fluroxypyr, fluroxypyr-meptyl, clopyralid-olamine salt, clopyralid-potassium salt, clopyralid-triethylammonium salt, halauxifen, halauxifen-methyl, florpyrauxifen and florpyrauxifen-benzyl (including agriculturally acceptable salts or derivatives thereof).

[13] The herbicidal composition according to [1], wherein the B-10 is the group consisting of: glyphosate, glyphosate-isopropylammonium salt, glyphosate-ammonium salt, glyphosate-dimethylamine salt, glyphosate-monoethanolamine salt, glyphosate-potassium salt and glyphosate-guanidine salt (including agriculturally acceptable salts or derivatives thereof).

[14] The herbicidal composition according to [1], wherein the B-11 is the group consisting of: glufosinate, glufosinate-ammonium salt, glufosinate-P and glufosinate-P-sodium salt (including agriculturally acceptable salts or derivatives thereof).

[15] The herbicidal composition according to [1], wherein the B-12 is the group consisting of: EPTC, diflufenzopyr, diflufenzopyr-sodium salt, clomazone, bixlozone, cinmethylin, MSMA, paraquat, paraquat-dichloride, diquat, diquat-dibromide and tetflupyrolimet (including agriculturally acceptable salts or derivatives thereof).

[16] The herbicidal composition according to [1], wherein the safener group C is the group consisting of:

benoxacor, cyprosulfamide and isoxadifen-ethyl (including agriculturally acceptable salts or derivatives thereof).

[17] The herbicidal composition according to any one of [1] to [16], comprising a carrier.

[18] A method for controlling weeds, comprising a step of simultaneously or sequentially applying one or more uracil compounds selected from the group consisting of a compound represented by formula (I) and a compound represented by formula (II), and one or more compounds selected from the group consisting of the herbicide compound group B and the safener group C to the place where weeds are growing or will grow.

[19] The method for controlling weeds according to [18], wherein a weight ratio of an application rate of the uracil compounds to that of one or more compounds selected from the group consisting of the herbicide compound group B and the safener group C is within a range of 1:0.02 to 1:50.

[20] The method according to [18] or [19], wherein the place where weeds are growing or will grow is a crop field.

[21] Use of the herbicidal composition according to any one of [1] to [16], for controlling weeds.

EFFECT OF INVENTION

According to the present invention, it becomes possible to highly effectively control weeds.

MODE FOR CARRYING OUT THE INVENTION

The herbicidal composition of the present invention (hereinafter referred to as "present composition") comprises one or more uracil compounds (hereinafter referred to as "present uracil compounds") selected from the group consisting of the compound represented by formula (I) (hereinafter referred to as "compound X") and the compound represented by formula (II) (hereinafter referred to as "compound Y") and one or more compounds selected from the group consisting of the herbicide compound group B and the safener group C.

As the compound X, a specific crystal form has been known to exist (see WO 2017/202768), and the crystal form is included in the compound X.

As the compound Y, four or more crystalline polymorphisms have been known to exist (see WO 2019/101533), and all of these crystalline polymorphisms and mixtures containing any two or more crystalline polymorphisms thereof are included in the compound Y.

In the case where a suspension concentrate, an oil dispersion, a wettable powder, a water dispersible granule or a granule or the like is prepared using any crystals selected from crystalline polymorphisms of the compound X or the compound Y, a volume median diameter of crystal particles is usually 0.1 to 10 μm, preferably 0.2 to 5 μm, more preferably 1 to 4 μm, and still more preferably 2 to 3 μm. Particularly preferred is a suspension concentrate in which the volume median diameter of crystal particles is 2 to 3 μm. The particle size distribution of the crystal can also be expressed based on any percentage, in addition to median (50%), and preferable range can be expressed as "volume (40%) diameter of 2.5 μm to volume)(60° diameter of 2.5 μm". Since the crystal of the compound X or the compound Y having a specified crystal structure has a specific density, it is substantially the same even if the volume median diameter is expressed by the weight median diameter, and it can also be expressed by any percentage.

The method for controlling weeds of the present invention (hereinafter referred to as "present method") comprises a step of simultaneously applying or a step of sequentially applying the present uracil compounds and one or more compounds selected from the group consisting of the herbicide compound group B and the safener group C to the place where weeds are growing or will grow. In the case of simultaneously applying, the present composition is applied. In the case of sequentially applying, the order of applying the present uracil compounds and applying one or more compounds selected from the group consisting of the herbicide compound group B and the safener group C is not particularly limited.

In the present method, the present uracil compounds and one or more compounds selected from the group consisting of the herbicide compound group B and the safener group C are applied to the place where weeds are growing or will grow in a crop field, a vegetable field, an orchard or a non-crop area, etc. In the crop field, the present uracil compounds and one or more compounds selected from the group consisting of the herbicide compound group B and the safener group C may be applied before, simultaneously with and/or after seeding crop seeds.

The present composition is usually a formulation prepared by mixing the present uracil compounds and one or more compounds selected from the group consisting of the herbicide compound group B and the safener group C with a carrier such as a solid carrier and a liquid carrier, and adding adjuvants for formulation such as surfactant as necessary. The formulation type is preferably a suspension concentrate, an oil dispersion, a wettable powder, a water dispersible granule, a granule and an emulsifiable concentrate. It may also be possible to use the present composition in combination with a formulation comprising other herbicides as active ingredients. It may also be possible to use a formulation comprising the present uracil compounds alone as active ingredients in combination with a formulation comprising one or more compounds selected from the group consisting of the herbicide compound group B and the safener group C as active ingredients.

The total content of the present uracil compounds and one or more compounds selected from the group consisting of the herbicide compound group B and the safener group C in the present composition is usually within a range of 0.01 to 90° by weight, and preferably 1 to 80° by weight.

The present composition is used for controlling weeds. The method for applying the present composition include, for example, a method for spraying the present composition on the soil of a cultivation field and a method for spraying the present composition to weeds grown. Spraying the present composition is usually performed by spraying a spray liquid obtained by mixing the present composition with water, using a spraying machine. The spray liquid amount is not particularly limited and is usually 50 to 1,000 L/ha, preferably 100 to 500 L/ha, and more preferably 140 to 300 L/ha.

After this paragraph, when a compound selected from the herbicide compound group B is a salt (e.g., a glyphosate-potassium salt), its weight is represented by an acid equivalent.

In the present composition, the mixing ratio by weight of the present uracil compounds to one or more compounds selected from the group consisting of the herbicide compound group B and the safener group C is within a range of 1:0.02 to 1:50.

In the present method, the weight ratio of an application rate of the present uracil compounds to an application rate of one or more compounds selected from the group consisting of the herbicide compound group B and the safener group C is within a range of 1:0.02 to 1:50.

In the present composition, examples of further preferable mixing ratio by weight of the present uracil compounds to one or more compounds selected from the group consisting of the herbicide compound group B and the safener group C include about 1:0.1, 1:0.2, 1:0.3, 1:0.5, 1:0.6, 1:0.7, 1:0.8, 1:1, 1:1.2, 1:1.4, 1:1.6, 1:1.8, 1:2, 1:2.2, 1:2.4, 1:2.6, 1:2.8, 1:3, 1:5, 1:7, 1:10, 1:15, 1:20, 1:30, 1:40 and 1:50.

In the present method, examples of further preferable weight ratio of an application rate of the present uracil compounds to an application rate of one or more compounds selected from the group consisting of the herbicide compound group B and the safener group C include about 1:0.1, 1:0.2, 1:0.3, 1:0.5, 1:0.6, 1:0.7, 1:0.8, 1:1, 1:1.2, 1:1.4, 1:1.6, 1:1.8, 1:2, 1:2.2, 1:2.4, 1:2.6, 1:2.8, 1:3, 1:5, 1:7, 1:10, 1:15, 1:20, 1:30, 1:40 and 1:50.

"About" as used herein includes a range of a ratio increased or decreased by 10% by weight compared with a specified ratio. For example, about 1:2 includes a range of 1:1.8 to 1:2.2.

In the present composition and the present method, examples of particularly preferable combination of the present uracil compounds and one or more compounds selected from the group consisting of the herbicide compound group B and the safener group C and a range of the weight ratio are mentioned below, but are not limited thereto.

Combination of the compound X and pyrithiobac (1:0.1 to 1:20);

Combination of the compound X and pyrithiobac-sodium salt (1:0.1 to 1:20);

Combination of the compound X and chlorimuron-ethyl (1:0.1 to 1:20);

Combination of the compound X and foramsulfuron (1:0.1 to 1:20);

Combination of the compound X and halosulfuron-methyl (1:0.1 to 1:20);

Combination of the compound X and nicosulfuron (1:0.1 to 1:20);

Combination of the compound X and primisulfuron-methyl (1:0.1 to 1:20);

Combination of the compound X and rimsulfuron (1:0.1 to 1:20);

Combination of the compound X and trifloxysulfuron-sodium salt (1:0.1 to 1:20);

Combination of the compound X and chlorsulfuron (1:0.1 to 1:20);

Combination of the compound X and iodosulfuron-methyl-sodium (1:0.1 to 1:20);

Combination of the compound X and iofensulfuron-sodium (1:0.1 to 1:20);

Combination of the compound X and metsulfuron-methyl (1:0.1 to 1:20);

Combination of the compound X and prosulfuron (1:0.1 to 1:20);

Combination of the compound X and thifensulfuron-methyl (1:0.1 to 1:20);

Combination of the compound X and tribenuron-methyl (1:0.1 to 1:20);

Combination of the compound X and thiencarbazone-methyl (1:0.1 to 1:20);

Combination of the compound X and cloransulam-methyl (1:0.1 to 1:20);

Combination of the compound X and flumetsulam (1:0.1 to 1:20);

Combination of the compound X and imazamethabenz-methyl (1:0.1 to 1:20);

Combination of the compound X and imazamox-ammonium salt (1:0.1 to 1:20);

Combination of the compound X and imazapic-ammonium salt (1:0.1 to 1:20);

Combination of the compound X and imazapyr-isopropylammonium salt (1:0.1 to 1:20);

Combination of the compound X and imazaquin-ammonium salt (1:0.1 to 1:20);

Combination of the compound X and imazethapyr-ammonium salt (1:0.1 to 1:20);

Combination of the compound X and fenoxaprop-ethyl (1:0.1 to 1:20);

Combination of the compound X and fenoxaprop-P-ethyl (1:0.1 to 1:20);

Combination of the compound X and fluazifop-butyl (1:0.1 to 1:20);

Combination of the compound X and fluazifop-P-butyl (1:0.1 to 1:20);

Combination of the compound X and quizalofop-ethyl (1:0.1 to 1:20);

Combination of the compound X and quizalofop-P-ethyl (1:0.1 to 1:20);

Combination of the compound X and clethodim (1:0.1 to 1:20);

Combination of the compound X and sethoxydim (1:0.1 to 1:20);

Combination of the compound X and carfentrazone-ethyl (1:0.1 to 1:20);

Combination of the compound X and saflufenacil (1:0.1 to 1:20);

Combination of the compound X and sulfentrazone (1:0.1 to 1:30);

Combination of the compound X and pyraflufen-ethyl (1:0.1 to 1:30);

Combination of the compound X and fluthiacet-methyl (1:0.1 to 1:20);

Combination of the compound X and flufenpyr-ethyl (1:0.1 to 1:20);

Combination of the compound X and flumiclorac-pentyl (1:0.1 to 1:20);

Combination of the compound X and flumioxazin (1:0.1 to 1:20);

Combination of the compound X and oxyfluorfen (1:0.1 to 1:30);

Combination of the compound X and acifluorfen-sodium salt (1:0.1 to 1:30);

Combination of the compound X and fomesafen-sodium salt (1:0.1 to 1:30);

Combination of the compound X and lactofen (1:0.1 to 1:30);

Combination of the compound X and tiafenacil (1:0.1 to 1:20);

Combination of the compound X and trifludimoxazin (1:0.1 to 1:20);

Combination of the compound X and ethyl [(3-{2-chloro-4-fluoro-5-[3-methyl-4-(trifluoromethyl)-2,6-dioxo-1,2,3,6-tetrahydropyrimidin-1-yl]phenoxy}pyridin-2-yl)oxy]acetate (1:0.1 to 1:20);

Combination of the compound X and bicyclopyrone (1:0.1 to 1:20);

Combination of the compound X and mesotrione (1:0.1 to 1:20);

Combination of the compound X and tembotrione (1:0.1 to 1:20);

Combination of the compound X and isoxaflutole (1:0.1 to 1:20);

Combination of the compound X and fenquinotrione (1:0.1 to 1:20);

Combination of the compound X and topramezone (1:0.1 to 1:20);

Combination of the compound X and tolpyralate (1:0.1 to 1:20);

Combination of the compound X and lancotrione-sodium salt (1:0.1 to 1:20);

Combination of the compound X and 2-methyl-N-(5-methyl-1,3,4-oxadiazol-2-yl)-3-(methylsulfonyl)-4-(trifluoromethyl)benzamide (CAS registry No.: 1400904-50-8) (1:0.1 to 1:20);

Combination of the compound X and 2-chloro-N-(1-methyl-1H-tetrazol-5-yl)-3-(methylthio)-4-(trifluoromethyl)benzamide (CAS registry No.: 1361139-71-0) (1:0.1 to 1:20);

Combination of the compound X and 4-(4-fluorophenyl)-6-[(2-hydroxy-6-oxo-1-cyclohexen-1-yl)carbonyl]-2-methyl-1,2,4-triazine-3,5(2H,4H)-dione (CAS registry No.: 1353870-34-4) (1:0.1 to 1:20);

Combination of the compound X and norflurazon (1:0.1 to 1:20);

Combination of the compound X and fluridone (1:0.1 to 1:20);

Combination of the compound X and bentazone (1:1 to 1:50);

Combination of the compound X and bromoxynil octanoate (1:1 to 1:50);

Combination of the compound X and diuron (1:1 to 1:50);

Combination of the compound X and linuron (1:1 to 1:50);

Combination of the compound X and fluometuron (1:1 to 1:50);

Combination of the compound X and simazine (1:1 to 1:50);

Combination of the compound X and atrazine (1:1 to 1:50);

Combination of the compound X and ametryne (1:1 to 1:50);

Combination of the compound X and prometryn (1:1 to 1:50);

Combination of the compound X and metribuzin (1:1 to 1:50);

Combination of the compound X and alachlor (1:1 to 1:50);

Combination of the compound X and acetochlor (1:1 to 1:50);

Combination of the compound X and metolachlor (1:1 to 1:50);

Combination of the compound X and S-metolachlor (1:1 to 1:50);

Combination of the compound X and dimethenamid (1:1 to 1:50);

Combination of the compound X and dimethenamid-P (1:1 to 1:50);

Combination of the compound X and pyroxasulfone (1:0.1 to 1:20);

Combination of the compound X and flufenacet (1:0.1 to 1:20);

Combination of the compound X and trifluralin (1:1 to 1:50);

Combination of the compound X and pendimethalin (1:1 to 1:50);

Combination of the compound X and ethalfluralin (1:1 to 1:50);

Combination of the compound X and 2,4-D (1:1 to 1:50);

Combination of the compound X and 2,4-D choline salt (1:1 to 1:50);

Combination of the compound X and 2,4-DB (1:1 to 1:50);

Combination of the compound X and dicamba (1:1 to 1:50);

Combination of the compound X and dicamba-biproamine (1:1 to 1:50);

Combination of the compound X and diglycolamine salt (1:1 to 1:50);

Combination of the compound X and fluroxypyr (1:1 to 1:50);

Combination of the compound X and fluroxypyr-meptyl (1:1 to 1:50);

Combination of the compound X and clopyralid-olamine salt (1:1 to 1:50);

Combination of the compound X and clopyralid-potassium salt (1:1 to 1:50);

Combination of the compound X and clopyralid-triethylammonium salt (1:1 to 1:50);

Combination of the compound X and halauxifen (1:0.1 to 1:20);

Combination of the compound X and halauxifen-methyl (1:0.1 to 1:20);

Combination of the compound X and florpyrauxifen (1:0.1 to 1:20);

Combination of the compound X and florpyrauxifen-benzyl (1:0.1 to 1:20);

Combination of the compound X and glyphosate (1:1 to 1:50);

Combination of the compound X and glyphosate-isopropylammonium salt (1:1 to 1:50);

Combination of the compound X and glyphosate-ammonium salt (1:1 to 1:50);

Combination of the compound X and glyphosate-dimethylamine salt (1:1 to 1:50);

Combination of the compound X and glyphosate-monoethanolamine salt (1:1 to 1:50);

Combination of the compound X and glyphosate-potassium salt (1:1 to 1:50);

Combination of the compound X and glyphosate-guanidine salt (1:1 to 1:50);

Combination of the compound X and glufosinate (1:1 to 1:50);

Combination of the compound X and glufosinate-ammonium salt (1:1 to 1:50);

Combination of the compound X and glufosinate-P (1:1 to 1:50);

Combination of the compound X and glufosinate-P-sodium salt (1:1 to 1:50);

Combination of the compound X and EPIC (1:1 to 1:50);

Combination of the compound X and diflufenzopyr (1:1 to 1:50);

Combination of the compound X and diflufenzopyr-sodium salt (1:1 to 1:50);

Combination of the compound X and clomazone (1:1 to 1:50);

Combination of the compound X and bixlozone (1:1 to 1:50);

Combination of the compound X and tetflupyrolimet (1:1 to 1:50);

Combination of the compound X and cinmethylin (1:1 to 1:50);

Combination of the compound X and MSMA (1:1 to 1:50);

Combination of the compound X and paraquat (1:1 to 1:50);

Combination of the compound X and paraquat-dichloride (1:1 to 1:50);

Combination of the compound X and diquat (1:1 to 1:50);

Combination of the compound X and diquat-dibromide (1:1 to 1:50);

Combination of the compound X and benoxacor (1:0.1 to 1:20);

Combination of the compound X and cyprosulfamide (1:0.1 to 1:20);

Combination of the compound X and isoxadifen-ethyl (1:0.1 to 1:20);

Combination of the compound Y and pyrithiobac (1:0.1 to 1:20);

Combination of the compound Y and pyrithiobac-sodium salt (1:0.1 to 1:20);

Combination of the compound Y and chlorimuron-ethyl (1:0.1 to 1:20);

Combination of the compound Y and foramsulfuron (1:0.1 to 1:20);

Combination of the compound Y and halosulfuron-methyl (1:0.1 to 1:20);

Combination of the compound Y and nicosulfuron (1:0.1 to 1:20);

Combination of the compound Y and primisulfuron-methyl (1:0.1 to 1:20);

Combination of the compound Y and rimsulfuron (1:0.1 to 1:20);

Combination of the compound Y and trifloxysulfuron-sodium salt (1:0.1 to 1:20);

Combination of the compound Y and chlorsulfuron (1:0.1 to 1:20);

Combination of the compound Y and iodosulfuron-methyl-sodium (1:0.1 to 1:20);

Combination of the compound Y and iofensulfuron-sodium (1:0.1 to 1:20);

Combination of the compound Y and metsulfuron-methyl (1:0.1 to 1:20);

Combination of the compound Y and prosulfuron (1:0.1 to 1:20);

Combination of the compound Y and thifensulfuron-methyl (1:0.1 to 1:20);

Combination of the compound Y and tribenuron-methyl (1:0.1 to 1:20);

Combination of the compound Y and thiencarbazone-methyl (1:0.1 to 1:20);

Combination of the compound Y and cloransulam-methyl (1:0.1 to 1:20);

Combination of the compound Y and flumetsulam (1:0.1 to 1:20);

Combination of the compound Y and imazamethabenz-methyl (1:0.1 to 1:20);

Combination of the compound Y and imazamox-ammonium salt (1:0.1 to 1:20);

Combination of the compound Y and imazapic-ammonium salt (1:0.1 to 1:20);

Combination of the compound Y and imazapyr-isopropylammonium salt (1:0.1 to 1:20);

Combination of the compound Y and imazaquin-ammonium salt (1:0.1 to 1:20);

Combination of the compound Y and imazethapyr-ammonium salt (1:0.1 to 1:20);

Combination of the compound Y and fenoxaprop-ethyl (1:0.1 to 1:20);

Combination of the compound Y and fenoxaprop-P-ethyl (1:0.1 to 1:20);

Combination of the compound Y and fluazifop-butyl (1:0.1 to 1:20);

Combination of the compound Y and fluazifop-P-butyl (1:0.1 to 1:20);

Combination of the compound Y and quizalofop-ethyl (1:0.1 to 1:20);

Combination of the compound Y and quizalofop-P-ethyl (1:0.1 to 1:20);

Combination of the compound Y and clethodim (1:0.1 to 1:20);

Combination of the compound Y and sethoxydim (1:0.1 to 1:20);

Combination of the compound Y and carfentrazone-ethyl (1:0.1 to 1:20);

Combination of the compound Y and saflufenacil (1:0.1 to 1:20);

Combination of the compound Y and sulfentrazone (1:0.1 to 1:30);

Combination of the compound Y and pyraflufen-ethyl (1:0.1 to 1:30);

Combination of the compound Y and fluthiacet-methyl (1:0.1 to 1:20);

Combination of the compound Y and flufenpyr-ethyl (1:0.1 to 1:20);

Combination of the compound Y and flumiclorac-pentyl (1:0.1 to 1:20);

Combination of the compound Y and flumioxazin (1:0.1 to 1:20);

Combination of the compound Y and oxyfluorfen (1:0.1 to 1:30);

Combination of the compound Y and acifluorfen-sodium salt (1:0.1 to 1:30);

Combination of the compound Y and fomesafen-sodium salt (1:0.1 to 1:30);

Combination of the compound Y and lactofen (1:0.1 to 1:30);

Combination of the compound Y and tiafenacil (1:0.1 to 1:20);

Combination of the compound Y and trifludimoxazin (1:0.1 to 1:20);

Combination of the compound Y and ethyl [(3-{2-chloro-4-fluoro-5-[3-methyl-4-(trifluoromethyl)-2,6-dioxo-1,2,3,6-tetrahydropyrimidin-1-yl]phenoxy}pyridin-2-yl)oxy]acetate (1:0.1 to 1:20);

Combination of the compound Y and bicyclopyrone (1:0.1 to 1:20);

Combination of the compound Y and mesotrione (1:0.1 to 1:20);

Combination of the compound Y and tembotrione (1:0.1 to 1:20);

Combination of the compound Y and isoxaflutole (1:0.1 to 1:20);

Combination of the compound Y and fenquinotrione (1:0.1 to 1:20);

Combination of the compound Y and topramezone (1:0.1 to 1:20);

Combination of the compound Y and tolpyralate (1:0.1 to 1:20);

Combination of the compound Y and lancotrione-sodium salt (1:0.1 to 1:20);

Combination of the compound Y and 2-methyl-N-(5-methyl-1,3,4-oxadiazol-2-yl)-3-(methylsulfonyl)-4-(trifluoromethyl)benzamide (CAS registry No.: 1400904-50-8) (1:0.1 to 1:20);

Combination of the compound Y and 2-chloro-N-(1-methyl-1H-tetrazol-5-yl)-3-(methylthio)-4-(trifluoromethyl)benzamide (CAS registry No.: 1361139-71-0) (1:0.1 to 1:20);

Combination of the compound Y and 4-(4-fluorophenyl)-6-[(2-hydroxy-6-oxo-1-cyclohexen-1-yl)carbonyl]-2-methyl-1,2,4-triazine-3,5(2H,4H)-dione (CAS registry No.: 1353870-34-4) (1:0.1 to 1:20);

Combination of the compound Y and norflurazon (1:0.1 to 1:20);

Combination of the compound Y and fluridone (1:0.1 to 1:20);

Combination of the compound Y and bentazone (1:1 to 1:50);

Combination of the compound Y and bromoxynil octanoate (1:1 to 1:50);

Comcination of the compound Y and diuron (1:1 to 1:50);

Comcination of the compound Y and linuron (1:1 to 1:50);

Comcination of the compound Y and fluometuron (1:1 to 1:50);

Comcination of the compound Y and simazine (1:1 to 1:50);

Comcination of the compound Y and atrazine (1:1 to 1:50);

Comcination of the compound Y and ametryne (1:1 to 1:50);

Comcination of the compound Y and prometryn (1:1 to 1:50);

Comcination of the compound Y and metribuzin (1:1 to 1:50);

Comcination of the compound Y and alachlor (1:1 to 1:50);

Comcination of the compound Y and acetochlor (1:1 to 1:50);

Comcination of the compound Y and metolachlor (1:1 to 1:50);
Comcination of the compound Y and S-metolachlor (1:1 to 1:50);
Comcination of the compound Y and dimethenamid (1:1 to 1:50);
Comcination of the compound Y and dimethenamid-P (1:1 to 1:50);
Comcination of the compound Y and pyroxasulfone (1:0.1 to 1:20);
Comcination of the compound Y and flufenacet (1:0.1 to 1:20);
Comcination of the compound Y and trifluralin (1:1 to 1:50);
Comcination of the compound Y and pendimethalin (1:1 to 1:50);
Comcination of the compound Y and ethalfluralin (1:1 to 1:50);
Comcination of the compound Y and 2,4-D (1:1 to 1:50);
Comcination of the compound Y and 2,4-D choline salt (1:1 to 1:50);
Comcination of the compound Y and 2,4-DB (1:1 to 1:50);
Comcination of the compound Y and dicamba (1:1 to 1:50);
Comcination of the compound Y and dicamba-biproamine (1:1 to 1:50);
Comcination of the compound Y and diglycolamine salt (1:1 to 1:50);
Comcination of the compound Y and fluroxypyr (1:1 to 1:50);
Comcination of the compound Y and fluroxypyr-meptyl (1:1 to 1:50);
Comcination of the compound Y and clopyralid-olamine salt (1:1 to 1:50);
Comcination of the compound Y and clopyralid-potassium salt (1:1 to 1:50);
Comcination of the compound Y and clopyralid-triethylammonium salt (1:1 to 1:50);
Comcination of the compound Y and halauxifen (1:0.1 to 1:20);
Comcination of the compound Y and halauxifen-methyl (1:0.1 to 1:20);
Comcination of the compound Y and florpyrauxifen (1:0.1 to 1:20);
Comcination of the compound Y and florpyrauxifen-benzyl (1:0.1 to 1:20);
Comcination of the compound Y and glyphosate (1:1 to 1:50);
Comcination of the compound Y and glyphosate-isopropylammonium salt (1:1 to 1:50);
Comcination of the compound Y and glyphosate-ammonium salt (1:1 to 1:50);
Comcination of the compound Y and glyphosate-dimethylamine salt (1:1 to 1:50);
Comcination of the compound Y and glyphosate-monoethanolamine salt (1:1 to 1:50);
Comcination of the compound Y and glyphosate-potassium salt (1:1 to 1:50);
Comcination of the compound Y and glyphosate-guanidine salt (1:1 to 1:50);
Comcination of the compound Y and glufosinate (1:1 to 1:50);
Comcination of the compound Y and glufosinate-ammonium salt (1:1 to 1:50);
Comcination of the compound Y and glufosinate-P (1:1 to 1:50);
Comcination of the compound Y and glufosinate-P-sodium salt (1:1 to 1:50);
Comcination of the compound Y and EPIC (1:1 to 1:50);
Comcination of the compound Y and diflufenzopyr (1:1 to 1:50);
Comcination of the compound Y and diflufenzopyr-sodium salt (1:1 to 1:50);
Comcination of the compound Y and clomazone (1:1 to 1:50);
Comcination of the compound Y and bixlozone (1:1 to 1:50);
Comcination of the compound Y and tetflupyrolimet (1:1 to 1:50);
Comcination of the compound Y and cinmethylin (1:1 to 1:50);
Comcination of the compound Y and MSMA (1:1 to 1:50);
Comcination of the compound Y and paraquat (1:1 to 1:50);
Comcination of the compound Y and paraquat-dichloride (1:1 to 1:50);
Comcination of the compound Y and diquat (1:1 to 1:50);
Comcination of the compound Y and diquat-dibromide (1:1 to 1:50);
Comcination of the compound Y and benoxacor (1:0.1 to 1:20);
Comcination of the compound Y and cyprosulfamide (1:0.1 to 1:20); and
Comcination of the compound Y and isoxadifen-ethyl (1:0.1 to 1:20).

The present composition can exert a synergistic herbicidal effect on a broad range of weeds compared to the effect that is expected from the effects obtained when each one of the present uracil compounds and one or more compounds selected from the group consisting of the herbicide compound group B and the safener group C is applied alone. Further, the present composition can efficiently control a broad range of weeds in a crop field and a vegetable field, each where a normal tilled or non-tilled cropping is performed, an orchard and a non-crop area.

The present method can exert a synergistic herbicidal effect on a broad range of weeds compared to the effect that is expected from the effects obtained when each one of the present uracil compounds and one or more compounds selected from the group consisting of the herbicide compound group B and the safener group C is applied alone. Further, the present method can efficiently control a broad range of weeds in a crop field and a vegetable field, each where a normal tilled or non-tilled cropping is performed, an orchard and a non-crop area.

The present composition or the present uracil compounds and one or more compounds selected from the group consisting of the herbicide compound group B and the safener group C may be applied to the agricultural field where crop seeds were seeded or will be seeded before, simultaneously with and/or after seeding the crop seeds treated with one or more compounds selected from the group consisting of insecticide compounds, nematicide compounds and fungicide compounds and the like.

The present composition may be used in combination with other agrochemical active compounds. Examples of the insecticide compounds, the nematicide compounds and the fungicide compounds to be used in combination with the present composition include neonicotinoid-based compounds, diamide-based compounds, carbamate-based compounds, organophosphorus-based compounds, biological nematicide compounds, other insecticide compounds and nematicide compounds, as well as azole-based compounds, strobilurin-based compounds, metalaxyl-based compounds, SDHI compounds, and other fungicide compounds and plant growth regulators.

The crop field in the present invention may include a food crop field such as a peanut field, a soybean (indeterminate growth habit, determinate growth habit, semi-determinate growth habit) field, a corn (dent corn, flint corn, flour corn, popcorn, waxy corn, sweet corn) field and a wheat (bread wheat (soft wheat, hard wheat, medium wheat, red wheat, white wheat), durum wheat, spelt wheat, club wheat, and, winter habit and spring habit thereof) field, a barley (two-row barley, six-row barley, hulless barley, hulless waxy barley and, winter habit and spring habit thereof) field, a feed crop field such as a sorghum field and an oat field, an industrial crop field such as a cotton (upland cotton, pima cotton) field and a rapeseed field, a canola (winter habit, spring habit) field, and a sugar crop field such as a sugarcane field and a sugar beet field.

The vegetable field in the present invention may include a field for cultivating solanaceae vegetables (eggplant, tomato, green pepper, chili pepper, potato, etc.), a field for cultivating cucurbitaceae vegetables (cucumber, pumpkin, zucchini, watermelon, melon, etc.), a field for cultivating cruciferous vegetables (radish, turnip, horseradish, kohlrabi, Chinese cabbage, cabbage, mustard, broccoli, cauliflower, etc.), a field for cultivating asteraceae vegetables (burdock, crown daisy, artichoke, lettuce, etc.), a field for cultivating liliaceae vegetables (welsh onion, onion, garlic, asparagus, etc.), a field for cultivating umbelliferae vegetables (carrot, parsley, celery, parsnip, etc.), a field for cultivating chenopodiaceae vegetables (spinach, beet, etc.), a field for cultivating lamiaceae vegetables (perilla, mint, basil, lavender, etc.), a strawberry field, a sweet potato field, a yam field, and an aroid field, etc.

The land under perennial crops in the present invention may include an orchard, a tea field, a mulberry field, a coffee field, a banana field, a palm field, a flowering tree farm, a flowering tree field, a planting stock field, a nursery field, a forest land, or a garden. The orchard tree in the present invention may include pomaceous fruits (apple, pear, Japanese pear, Chinese quince, quince, etc.), stone fruits (peach, plum, nectarine, Japanese apricot, yellow peach, apricot, prune, etc.), citrus fruits (citrus unshiu, orange, lemon, lime, grapefruit, etc.), nut trees (chestnut, walnut, hazelnut, almond, pistachio, cashew nut, macadamia nut, etc.), berry fruits (grape, blueberry, cranberry, blackberry, raspberry, etc.), persimmon, olive, loquat, etc.

The non-crop area in the present invention may include an athletic field, an empty lot, a railroad edge, a park, a parking area, a road edge, a dry riverbed, under power lines, a building land, a factory site, etc.

The crops cultivated in a crop field in the present invention is not limited as long as their varieties are varieties which are usually cultivated as crops.

The plant of the variety mentioned above may be a plant which can be produced by natural hybridization, a plant which can occur as the result of a mutation, an F1 hybrid plant, or a transgenic plant (also referred to as a "genetically modified plant"). These plants generally have properties such as a property that the tolerance to herbicides is imparted, a property that a toxic substance against pests is accumulated, a property that the sensitivity to a plant disease is suppressed, a property that yield potential is increased, a property that the resistance to a biological or non-biological stress factor is improved, a property that a substance is accumulated, and improvement in a storage property or processability.

The term "F1 hybrid plant" refers to a plant of a first filial generation which is produced by hybridizing two different varieties with each other, and is generally a plant which has a more superior trait to that of either one of parents thereof, i.e., has a hybrid vigor property. The term "transgenic plant" refers to a plant which is produced by introducing a foreign gene from another organism such as a microorganism into a plant and which has a property that cannot be acquired easily by hybridization breeding, induction of a mutation or a naturally occurring recombination under a natural environment.

Examples of the technique for producing the above-mentioned plants include a conventional breeding technique, a transgenic technique, a genome-based breeding technique, a new breeding technique, and a genome editing technique. The conventional breeding technique is a technique for producing a plant having a desirable property by mutation or hybridization. The transgenic technique is a technique for imparting a new property to a specific organism (e.g., a microorganism) by isolating a gene (DNA) of interest from the organism and then introducing the gene (DNA) into the genome of another target organism, and an antisense technique or an RNA interference technique which is a technique for imparting a new or improved property to a plant by silencing another gene occurring in the plant. The genome-based breeding technique is a technique for increasing the efficiency of breeding using genomic information, and includes a DNA marker (also referred to as "genome marker" or "gene marker") breeding technique and genomic selection. For example, the DNA marker breeding is a method in which an offspring having a desired useful trait gene is selected from many hybrid offspring using a DNA marker that is a DNA sequence capable of serving as an indicator of the position of a specific useful trait gene on a genome. The analysis of a hybrid offspring of a plant at a seedling stage thereof using the DNA marker has such a characteristic that it becomes possible to shorten the time required for breeding effectively.

The genomic selection is such a technique that a prediction equation is produced from a phenotype and genomic information both obtained in advance and then a property is predicted from the prediction equation and the genomic information without carrying out the evaluation of the phenotype. The genomic selection can contribute to the increase in efficiency of breeding. A "new breeding technique" is a collective term for breeding techniques with a combination of molecular biological techniques. Examples of the new breeding technique include techniques such as cisgenesis/intragenesis, oligonucleotide-directed mutagenesis, RNA-dependent DNA methylation, genome editing, grafting to a GM rootstock or scion, reverse breeding, agroinfiltration, and seed production technology (SPT). The genome editing technique is a technique that converts genetic information in a sequence-specific manner, and enables deletion of a base sequence, substitution of an amino acid sequence, introduction of a foreign gene and the like. Examples of the tool for the technique include zinc-finger nuclease (ZFN), TALEN, CRISPR/Cas9, CRISPER/Cpfl and meganuclease which can cleave DNA in a sequence-specific manner, and a sequence-specific genome modification technique using CAS9 nickase, Target-AID and the like which is produced by any one of the modification of the above-mentioned tools.

Examples of the above-mentioned plants include plants listed in genetically modified crops registration database (GM APPROVAL DATABASE) in an electric information site in INTERNATIONAL SERVICE for the ACQUISITION of AGRI-BIOTECH APPLICATIONS (ISAAA) (http://www.isaaa.org/). More specific examples of the plans include a herbicide-tolerant plant, a pest-resistant plant, a plant disease-resistant plant, a plant of which the quality (e.g., the increase or decrease in content or the change in composition) of a product (e.g., starch, amino acid, fatty acid, etc.) is modified, a fertility trait modified plant, a non-biological stress-tolerant plant or a plant of which a trait associated with growth or yield is modified.

The plant imparted with tolerance to herbicides by a transgenic technique also includes plants each, by a transgenic technique, imparted with the tolerance to: a 4-hydroxyphenylpyruvate dioxygenase (abbreviated as "HPPD", hereinafter) inhibitor such as isoxaflutole and mesotrione; an acetolactate synthase (abbreviated as "ALS", hereinafter) inhibitor such as an imidazolinone-type herbicide including imazethapyr and a sulfonylurea-type herbicide including thifensulfuron-methyl; a 5-enolpyruvylshikimate-3-phosphate synthase (abbreviated as "EPSP", hereinafter) inhibitor such as glyphosate; a glutamine synthase inhibitor such as glufosinate; an auxin-type herbicide such as 2,4-D and dicamba; and an oxynil-type herbicide including bromoxynil. Preferred examples of the herbicide-tolerant transgenic plant include: a cereal such as wheat, barley, rye and oat;

canola, sorghum, soybean, rice, rapeseed, sugar beet, sugarcane, grape, lentil, sunflower, alfalfa, a pomaceous fruit, a stone fruit, coffee, tea, strawberry, wheat grass, and a vegetable such as tomato, potato, cucumber and lettuce; more preferably a cereal such as wheat, barley, rye and oat, soybean, rice, vine, tomato, potato, and a pomaceous fruit.

Hereinbelow, specific examples of the herbicide-tolerant plant will be mentioned.

Plants tolerant to glyphosate herbicides; produced by introducing at least one of a glyphosate-tolerant EPSPS gene originated from Agrobacterium tumefaciens strain CP4 (CP4 epsps), a glyphosate-metabolizing enzyme gene in which metabolic activity is enhanced by a shuffling technique for a glyphosate-metabolizing enzyme (glyphosate N-acetyltransferase) gene originated from Bacillus licheniformis (gat4601, gat4621), a glyphosate-metabolizing enzyme originated from Ochrobacterum anthropi strain LBAA (glyphosate oxidase gene, goxv247) or an EPSP gene originated from corn and having a glyphosate tolerance mutation (mepsps, 2mepsps). Examples of the major plant include alfalfa (*Medicago sativa*), *Argentina canola* (*Brassica napus*), cotton (*Gossypium hirsutum* L.), creeping bentgrass (*Agrostis stolonifera*), corn (*Zea mays* L.), polish canola (*Brassica rapa*), potato (*Solanum tuberosum* L.), soybean (*Glycine max* L.), sugar beet (*Beta vulgaris*) and wheat (*Triticum aestivum*). Some of the glyphosate-tolerant transgenic plants are commercially available. For example, a genetically modified plant which expresses glyphosate-tolerant EPSPS originated from Agrobacterium is commercially available by trade names including the trademark of "Roundup Ready (registered trademark)"; a genetically modified plant which expresses a glyphosate-metabolizing enzyme originated from *Bacillus* in which metabolic activity is enhanced by a shuffling technique is commercially available by the trade names of "Optimum (registered trademark) GAT (trademark)", "Optimum (registered trademark) Gly canola" and the like; and a genetically modified plant which expresses EPSPS having a glyphosate tolerance mutation originated from corn is commercially available by the trademark of "GlyTol (trademark)".

Plants tolerant to glufosinate herbicides; produced by introducing at least one of a gene (bar) for phosphinothricin N-acetyltransferase (PAT) which is a glufosinate-metabolizing enzyme originated from *Streptomyces hygroscopicus*, a gene (pat) for a phosphinothricin N-acetyltransferase (PAT) enzyme which is a glufosinate-metabolizing enzyme originated from *Streptomyces* viridochromogenes or a synthetic pat gene (pat syn) originated from *Streptomyces viridochromogenes* strain Tu494. Examples of the major plant include Argentina canola (*Brassica napus*), chicory (*Cichorium intybus*), cotton (*Gossypium hirsutum* L.), corn (*Zea mays* L.), polish canola (*Brassica rapa*), rice (*Oryza sativa* L.), soybean (*Glycine max* L.) and sugar beet (*Beta vulgaris*). Some of the glufosinate-tolerant genetically modified plants are commercially available. The glufosinate-metabolizing enzyme (bar) originated from *Streptomyces* hygroscopicus and a genetically modified plant originated from *Streptomyces viridochromogenes* are commercially available by the trade names including "LibertyLink (trademark)", "InVigor (trademark)" and "WideStrike (trademark)".

Plants tolerant to oxynil-type herbicides (e.g., bromoxynil); includes transgenic plants tolerant to oxynil-type herbicides, for example, bromoxynil, into which a nitrilase gene (bxn) which is an oxynil-type herbicide (e.g., bromoxynil)-metabolizing enzyme originated from *Klebsiella pneumoniae* subsp. *Ozaenae* is introduced. Examples of the major plant include Argentina Canola (*Brassica napes*), cotton (*Gossypium hirsutum* L.) and tobacco (*Nicotiana tabacum* L.), which are commercially available by the trade names including "Navigator (trademark) canola" or "BXN (trademark)".

Plants tolerant to ALS inhibitors; carnation (Dianthus caryophyllus) having, introduced therein, an ALS inhibitor-tolerant ALS gene (surB) originated from tobacco (*Nicotiana tabacum*) as a selection marker is commercially available by the trade names of "Moondust (trademark)", "Moonshadow (trademark)", "Moonshade (trademark)", "Moonlite (trademark)", "Moonaqua (trademark)", Moonvista (trademark)", "Moonique (trademark)", "Moonpearl (trademark)", "Moonberry (trademark)" and "Moonvelvet (trademark)"; lineseed (*Linum usitatissumum* L.) having, introduced therein, an ALS inhibitor-tolerant ALS gene (als) originated from mouse-ear cress (*Arabidopsis thaliana*) is commercially available by the trademark of "CDC Triffid Flax"; corn (*Zea mays* L.) having tolerance to a sulfonylurea-type herbicide and an imidazolinone-type herbicide and having, introduced therein, an ALS inhibitor-tolerant ALS gene (zm-hra) originated from corn is commercially available by the trademark of "Optimum (trademark) GAT (trademark)"; soybean having tolerance to an imidazolinone-type herbicide and having, introduced therein, an ALS inhibitor-tolerant ALS gene (csr1-2) originated from mouse-ear cress is commercially available by the trademark of "Cultivance"; and soybean having tolerance to a sulfonylurea-type herbicide and having, introduced therein, an ALS inhibitor-tolerant ALS gene (gm-hra) originated from soybean (*Glycine max*) is commercially available by the trade names of "Treus (trademark)", "Plenish (trademark)" and "Optimum GAT (trademark)". Cotton having, introduced therein, an ALS inhibitor-tolerant ALS gene (S4-HrA) originated from tobacco (*Nicotiana tabacum* cv. *Xanthi*) can also be mentioned.

Plants tolerant to HPPD inhibitors; soybean into which both a mesotrione-tolerant HPPD gene (avhppd-03) originated from oat (Avena sativa) and a gene (pat) for a phosphinothricin N-acetyltransferase (PAT) enzyme which is a glufosinate-metabolizing enzyme originated from *Streptomyces viridochromogenes* are introduced is commercially available by the trademark of "Herbicide-tolerant Soybean line".

Plants tolerant to 2,4-D; corn having, introduced therein, an aryloxyalkanoate dioxygenase gene (aad-1) which is a 2,4-D-metabolizing enzyme originated from *Sphingobium herbicidovorans* is commercially available by the trademark of "Enlist (trademark) Maize". Soybean and cotton having, introduced therein, an aryloxyalkanoate dioxygenase gene (aad-12) which is a 2,4-D-metabolizing enzyme originated from *Delftia acidovorans* and having tolerance to 2,4-D are commercially available by the trademark of "Enlist (trademark) Soybean".

Plants tolerant to dicamba; includes soybean and cotton having, introduced therein, a dicamba monooxygenase gene (dmo) which is a dicamba-metabolizing enzyme originated from Stenotrophomonas maltophilia strain DI-6. Soybean (*Glycine max* L.) into which a glyphosate-tolerant EPSPS gene (CP4 epsps) originated from *Agrobacterium tumefaciens* strain CP4 is also introduced simultaneously with the above-mentioned gene is commercially available as "tenuity (registered trademark) Roundup Ready (trademark) 2 Xtend (trademark)".

Examples of a commercially available transgenic plant imparted with tolerance to herbicides include corn "Roundup Ready Corn", "Roundup Ready 2", "Agrisure GT", "Agrisure GT/CB/LL", "Agrisure GT/RW", "Agrisure 3000GT", "YieldGard VT Rootworm/RR2" and "YieldGard VT Triple" each having tolerance to glyphosate; soybean "Roundup Ready Soybean" and "Optimum GAT" each having tolerance to glyphosate; cotton "Roundup Ready Cootton" and "Roundup Ready Flex" each having tolerance to glyphosate; canola "Roundup Ready Canola" having tolerance to glyphosate; alfalfa "Roundup Ready Alfalfa" having tolerance to glyphosate and rice "Roundup Ready Rice" having tolerance to glyphosate; corn "Roundup Ready 2", "Liberty Link", "Herculex 1", "Herculex RW", "Herculex Xtra", "Agrisure GT/CB/LL", "Agrisure CB/LL/RW" and "Bt10" each having tolerance to glufosinate; cotton "FiberMax Liberty Link" having tolerance to glufosinate; rice "Liberty Link Rice" having tolerance to glufosinate; canola "in Vigor" having tolerance to glufosinate; cotton "BXN" having tolerance to bromoxynil; and canola "Navigator" and "Compass" having tolerance to bromoxynil. Other plants which are modified with respect to herbicides are also widely known, such as: alfalfa, apple, barley, eucalyptus, lineseed, grape, lentil, rapeseed, pea, potato, rice, sugar beet, sunflower, tobacco, tomato, turf grass and wheat each having tolerance to glyphosate (see, for example, U.S. Pat. Nos. 5,188,642, 4,940,835, 5,633,435, 5,804,425 and 5,627,061); bean, cotton, soybean, pea, potato, sunflower, tomato, tobacco, corn, sorghum and sugarcane each having tolerance to dicamba (see, for example, WO 2008051633, U.S. Pat. Nos. 7,105,724 and 5,6704,54); soybean, sugar beet, potato, tomato and tobacco each having tolerance to glufosinate (see, for example, U.S. Pat. Nos. 6,376,754, 5,646,024 and 5,561,236); cotton, peppers, apple, tomato, sunflower, tobacco, potato, corn, cucumber, wheat, soybean, sorghum and millets each having tolerance to 2,4-D (see, for example, U.S. Pat. Nos. 6,153,401, 6,100,446, WO 2005107437, U.S. Pat. Nos. 5,608,147 and 5,670,454); canola, corn, barnyard millet, barley, cotton, brown mustard, lettuce, lentil, melon, foxtail millet, oat, rapeseed, potato, rice, rye, sorghum, soybean, sugar beet, sunflower, tobacco, tomato and wheat each having tolerance to an ALS inhibitor (e.g., a sulfonylurea-type herbicide and an imidazolinone-type herbicide) (see, for example, U.S. Pat. No. 5,013,659, WO 2006060634, U.S. Pat. Nos. 4,761,373, 5,304,732, 6,2114,38, 6,211,439 and 6,222,100) (particularly, rice having tolerance to an imidazolinone-type herbicide; rice having a specific mutation (e.g., S653N, S654K, A122T, 5653(At)N, S654(At)K, A122(At)T) in an acetolactate synthase gene (acetohydroxyacid synthase gene) and the like (see, for example, US 2003/0217381, WO 2005/20673)); barley, sugarcane, rice, corn, tobacco, soybean, cotton, rapeseed, sugar beet, wheat and potato each having tolerance to an HPPD inhibitor (e.g., an isoxazole-type herbicide such as isoxaflutole; a triketone-type herbicide such as sulcotrione and mesotrione; a pyrazole-type herbicide such as pyrazolynate and diketonitrile that is a decomposition product of isoxaflutole (see, for example, WO 2004/055191, WO 199638567, WO 1997049816 and U.S. Pat. No. 6,791,014).

Examples of a plant that is imparted with tolerance to herbicides by a classical breeding technique or genome-based breeding technique include: rice "Clearfield Rice", wheat "Clearfield Wheat", sunflower "Clearfield Sunflower", lentil "Clearfield lentils" and canola "Clearfield canola" (a product by manufactured by BASF) each having tolerance to an imidazolinone-type ALS inhibitor such as imazethapyr and imazamox; soybean "STS soybean" having tolerance to a sulfonylurea-type ALS inhibitor such as thifensulfuron-methyl; sethoxydim-tolerant corn "SR corn" and "Poast Protected (registered trademark) corn" having tolerance to an acetyl CoA carboxylase inhibitor such as a trione oxime-type herbicide and an aryloxyphenoxypropionate-type herbicide; for example, sunflower "ExpressSun (registered trademark)" having tolerance to a sulfonylurea-type herbicide such as tribenuron; rice "Rrovisia (trademark) Rice" having tolerance to an acetyl CoA carboxylase inhibitor such as quizalofop; canola "Triazine Tolerant Canola" having tolerance to a PSII inhibitor.

An example of a plant that is imparted with tolerance to herbicides by a genome editing technique is canola "SU Canola (registered trademark)" having tolerance to a sulfonylurea-type herbicide and produced by Rapid Trait Development System (RIDS (registered trademark)). RIDS (registered trademark) corresponds to an oligonucleotide-directed mutagenesis employed in a genome editing technique, and is a technique whereby it becomes possible to introduce a mutation into a plant through Gene Repair Oligonucleotide (GRON), i.e., a DNA-RNA chimeric oligonucleotide, without needing to cleave DNA in the plant. Other examples of the plant also include: corn which is reduced in herbicide tolerance and a phytic acid content as the result of the deletion of endogenous gene IPK1 using a zinc finger nuclease (see, for example, Nature 459, 437-441 2009); and rice which is imparted with herbicide tolerance using CRISPR/Cas9 (see, for example, Rice, 7, 5 2014).

The crop tolerant to a specific PPO inhibitor in the present invention includes a crop which is imparted with ability to produce PPO with decreased affinity to the PPO inhibitor by a transgenic technique and a crop which is imparted with ability to detoxicate/decompose the PPO inhibitor by cytochrome P450 monooxygenase by a transgenic technique. The crop tolerant to a specific PPO inhibitor may be a crop which is imparted with both ability to produce PPO with decreased affinity to the PPO inhibitor and ability to detoxicate/decompose the PPO inhibitor by cytochrome P450 monooxygenase by a transgenic technique. These tolerant crops are mentioned in, for example, Patent Documents such as WO 2011085221, WO 2012080975, WO 2014030090, WO 2015022640, WO 2015022636, WO 2015022639, WO 2015092706, WO 2016203377, WO 2017198859, WO 2018019860, WO 2018022777, WO 2017112589, WO 2017087672, WO 2017039969 and WO 2017023778 and Non-Patent Document (Pest Management Science, 61, 2005, 277-285).

The technique imparting tolerance to herbicides by a new breeding technique includes a breeding technique employing grafting, and as an example of imparting a trait of a GM rootstock to a scion, soybean in which tolerance to glyphosate is imparted to a non-transgenic soybean scion using Roundup Ready (registered trademark) soybean having tolerance to glyphosate as a rootstock (see Weed Technology 27:412-416 2013) can be mentioned.

The plants mentioned above also include a line imparted with two or more of tolerance to non-biological stress, plant disease resistance, tolerance to herbicides, pest resistance, growth or yield trait, nutrient uptake, quality of a product, fertility trait and the like as previously mentioned, using a transgenic technique, a classical breeding technique, a genome-based breeding technique, a new breeding technique or genome editing technique or the like, and a line imparted with two or more properties of a parental line by crossing plants of the same kind or having different properties.

Examples of a commercially available plant imparted with tolerance to two or more herbicides include: cotton "GlyTol (trademark) LibertyLink (trademark)" and "GlyTol (trademark) LibertyLink (trademark)" each having tolerance to glyphosate and glufosinate; corn "Roundup Ready (trademark) LibertyLink (trademark) Maize" having tolerance to glyphosate and tolerance to glufosinate; soybean "Enlist (trademark) Soybean" having tolerance to glufosinate and tolerance to 2,4-D; soybean "Genuity (registered trademark) Roundup Ready (trademark) 2 Xtend (trademark)" having tolerance to glyphosate and tolerance to dicamba; corn and soybean "OptimumGAT (trademark)" having tolerance to glyphosate and tolerance to an ALS inhibitor; genetically modified soybean "Enlist E3 (trademark)" and "Enlist (trademark) Roundup Ready 2 Yield (registered trademark)" each having tolerance to three herbicides of glyphosate, glufosinate and 2,4-D; genetically modified corn "Enlist (trademark) Roundup Ready (registered trademark) Corn 2" having tolerance to glyphosate, 2,4-D and aryloxyphenoxypropionate-type (FOPs) herbicides; genetically modified corn "Enlist (trademark) Roundup Ready (registered trademark) Corn 2" having tolerance to glyphosate, 2,4-D and aryloxyphenoxypropionate-type (FOPs) herbicides; genetically modified cotton "Bollgard II (registered trademark) XtendFlex (trademark) Cotton" having tolerance to dicamba, glyphosate and glufosinate; and genetically modified cotton "Enlist (trademark) Cotton" having tolerance to three herbicides of glyphosate, glufosinate and 2,4-D. In addition, the following plants are also developed: cotton having tolerance to glufosinate and 2,4-D; cotton having tolerance to both glufosinate and dicamba; corn having tolerance to both glyphosate and 2,4-D; soybean having tolerance to both glyphosate and an HPPD herbicide; and genetically modified corn having tolerance to glyphosate, glufosinate, 2,4-D, aryloxyphenoxypropionate-type (FOPs) herbicides and cyclohexadione-type (DIMs) herbicides.

Examples of a commercially available plant imparted with tolerance to herbicides and pest resistance include: corn "YieldGard Roundup Ready" and "YieldGard Roundup Ready 2" each having tolerance to glyphosate and resistance to corn borer; corn "Agrisure CB/LL" having tolerance to glufosinate and resistance to corn borer; corn "Yield Gard VT Root worm/RR2" having tolerance to glyphosate and resistance to corn rootworm; corn "Yield Gard VT Triple" having tolerance to glyphosate and resistance to corn rootworm and corn borer; corn "Herculex I" having tolerance to glufosinate and resistance to a lepidopteran pest (CrylF) (e.g., resistance to western bean cutworm, corn borer, black cutworm and fall armyworm); corn "YieldGard Corn Rootworm/Roundup Ready 2" having tolerance to glyphosate and resistance to corn rootworm; corn "Agrisure GT/RW" having tolerance to glufosinate and resistance to a coleopteran pest for corn (Cry3A) (e.g., resistance to Western corn rootworm, Northern corn rootworm and Mexican corn rootworm); corn "Herculex RW" having tolerance to glufosinate and resistance to a coleopteran pest (Cry34/35Ab1) (e.g., resistance to Western corn rootworm, Northern corn rootworm and Mexican corn rootworm); corn "Yield Gard VT Root worm/RR2" having tolerance to glyphosate and resistance to corn rootworm; and cotton "Bollgard 3 (registered trademark) XtendFlex (registered trademark)" having tolerance to dicamba, tolerance to glyphosate, tolerance to glufosinate and resistance to a lepidopteran pest (e.g., resistance to ballworms and tobacco budworm, armyworms and the like).

In the present method, the present uracil compounds and one or more compounds selected from the group consisting of the herbicide compound group B and the safener group C are applied to the place where weeds are growing or will grow. Examples of the method for applying the present uracil compounds and one or more compounds selected from the group consisting of the herbicide compound group B and the safener group C include a method for spraying a spray liquid containing the present uracil compounds and one or more compounds selected from the group consisting of the herbicide compound group B and the safener group C on the soil and a method for spraying the spray liquid to weeds.

The application rate of the present uracil compounds and one or more compounds selected from the group consisting of the herbicide compound group B and the safener group C is, as the total amount of the present uracil compounds and one or more compounds selected from the group consisting of the herbicide compound group B and the safener group C, usually 1 to 10,000 g per 10,000 $m^2$, preferably 2 to 5,000 g per 10,000 $m^2$, and more preferably 5 to 2,000 g per 10,000 $m^2$.

In the present method, the present uracil compounds and one or more compounds selected from the group consisting of the herbicide compound group B and the safener group C may be used in combination with an adjuvant.

The type of the adjuvant is not particularly limited, and examples of the adjuvant include oil-based adjuvants such as Agri-Dex and MSO, nonionic adjuvants (ester or ether of polyoxyethylene) such as Induce, anionic adjuvants (substituted sulfonate) such as Gramin S, cationic adjuvants (polyoxyethylene amine) such as Genamin T 200BM, and organosilicon-based adjuvants such as Silwett L77.

The pH and hardness of the spray liquid prepared when applying the present uracil compounds and one or more compounds selected from the group consisting of the herbicide compound group B and the safener group C are not particularly limited, and the pH is usually within a range of 5 to 9 and the hardness is usually within a range of 0 to 500 ppm as American hardness.

The period of time for applying the present uracil compounds and one or more compounds selected from the group consisting of the herbicide compound group B and the safener group C is not particularly limited, and the period of time is usually within a range of 5 a.m. to 9 p.m. and the photon flux density is usually 10 to 2,500 $\mu mol/m^2$/second.

The spraying pressure to be employed for the application of the present uracil compounds is not particularly limited, and is usually 30 to 120 PSI, and preferably 40 to 80 PSI.

In the present method, the type of the nozzle to be used in the application of the present uracil compounds may be a flat fan nozzle or a drift-reducing nozzle. Examples of the flat fan nozzle include products of Teejet 110 series and XR Teejet 110 series manufactured by Teejet. The volume median diameter of liquid droplets ejected through each of the nozzles is usually smaller than 430 microns at an ordinary spraying pressure, usually 30 to 120 PSI. A drift-reducing nozzle is a nozzle reduced in drift compared with a flat fan nozzle and is called as "air induction nozzle" or "pre-orifice nozzle". The volume median diameter of liquid droplets ejected through the drift-reducing nozzle is usually 430 microns or larger.

An air induction nozzle has an air guide part between an inlet (spray liquid introduction part) of the nozzle and an outlet (spray liquid ejection part) of the nozzle, so that liquid droplets filled with air can be formed upon the mixing the spray liquid with air. Examples of the air induction nozzle include: TDXL11003-D, TDXL11004-D1, TDXL11005-D1 and TDXL11006-D manufactured by Green Leaf Technology; TTI110025, TTI11003, TTI11004, TTI11005, TTI11006 and TTI11008 manufactured by Teejet; and ULD120-041, ULD120-051 and ULD120-061 manufactured by Pentair. A particularly desirable one is TTI11004.

A pre-orifice nozzle is a nozzle in which an inlet (a spray liquid introduction part) of the nozzle serves as a metering orifice, so that large liquid droplets can be formed by controlling the flow amount to be flown into the nozzle so as to decrease the pressure in the nozzle. When the pre-orifice nozzle is used, the pressure during the ejection of the spray liquid can be reduced by half compared with the pressure before the introduction of the spray liquid. Examples of the pre-orifice nozzle include: DR110-10, UR110-05, UR110-06, UR110-08 and UR110-10 manufactured by Wilger; and 1/4TTJ08 Turf Jet and 1/4TTJ04 Turf Jet manufactured by Teejet.

In the case where the present uracil compounds and one or more compounds selected from the group consisting of the herbicide compound group B and the safener group C are applied to a crop field, the present uracil compounds and one or more compounds selected from the group consisting of the herbicide compound group B and the safener group C may be applied before seeding crop seeds, and the present uracil compounds and one or more compounds selected from the group consisting of the herbicide compound group B and the safener group C may be applied simultaneously with and/or after seeding crop seeds.

That is, the present uracil compounds and one or more compounds selected from the group consisting of the herbicide compound group B and the safener group C are applied once before, simultaneously with, or after seeding crop seeds; twice except before seeding crop seeds, twice except simultaneously with seeding crop seeds, or twice except after seeding crop seeds; or three times at all timings of before seeding crop seeds, simultaneously with seeding crop seeds, and after seeding crop seeds.

In the case where the present uracil compounds and one or more compounds selected from the group consisting of the herbicide compound group B and the safener group C are applied before seeding crop seeds, the present uracil compounds and one or more compounds selected from the group consisting of the herbicide compound group B and the safener group C are applied from 50 days before seeding to immediately before seeding, preferably from 30 days before seeding to immediately before seeding, more preferably from 20 days before seeding to immediately before seeding, and still more preferably from 10 days before seeding to immediately before seeding.

In the case where the present uracil compounds and one or more compounds selected from the group consisting of the herbicide compound group B and the safener group C are applied after seeding crop seeds, the present uracil compounds and one or more compounds selected from the group consisting of the herbicide compound group B and the safener group C are applied usually from immediately after seeding to before flowering. The present uracil compounds and one or more compounds selected from the group consisting of the herbicide compound group B and the safener group C are applied more preferably from immediately after seeding to before sprouting, or from 1 to 6 leaf stages of crops.

The case where the present uracil compounds and one or more compounds selected from the group consisting of the herbicide compound group B and the safener group C are applied simultaneously with seeding the crop seeds is the case where a sowing machine and a spraying machine are integrated with each other.

The present uracil compounds are known compounds and can be produced by the method mentioned in WO 2017/202768.

Examples of the weeds which can be controlled by the present compound include the following weeds, but are not limited thereto.

Urticaceae weeds: small nettle (*Urtica urens*),

Polygonaceae weeds: black bindweed (*Polygonum convolvulus*), pale persicaria (*Polygonum lapathifolium*), Pennsylvania smartweed (*Polygonum pensylvanicum*), redshank (*Polygonum persicaria*), bristly lady's-thumb (*Polygonum longisetum*), knotgrass (*Polygonum aviculare*), equal-leaved knotgrass (*Polygonum arenastrum*), Japanese knotweed (*Polygonum cuspidatum*), Japanese dock (*Rumex japonicus*), curly dock (*Rumex crispus*), blunt-leaved dock (*Rumex obtusifolius*), and common sorrel (*Rumex acetosa*), Portulacaceae weeds: common purslane (*Portulaca oleracea*), Caryophyllaceae weeds: common chickweed (*Stellaria media*), water chickweed (*Stellaria aquatica*), common mouse-ear (*Cerastium holosteoides*), sticky mouse-ear (*Cerastium glomeratum*), corn spurrey (*Spergula arvensis*), and five-wound catchfly (*Silene gallica*), Molluginaceae weeds: carpetweed (*Mollugo verticillata*), Chenopodiaceae weeds: common lambsquarters (*Chenopodium album*), Indian goosefoot (*Chenopodium ambrosioides*), kochia (*Kochia scoparia*), spiny saltwort (*Salsola kali*), and Orach (*Atriplex* spp.), Amaranthaceae weeds: redroot pigweed (*Amaranthus retroflexus*), slender amaranth (*Amaranthus viridis*), livid amaranth (*Amaranthus lividus*), spiny amaranth (*Amaranthus spinosus*), smooth pigweed (*Amaranthus hybridus*), Palmer amaranth (*Amaranthus palmeri*), green pigweed (*Amaranthus patulus*), waterhemp (*Amaranthus tuberculatus*=*Amaranthus rudis*=*Amaranthus tamariscinus*), prostrate pigweed (*Amaranthus blitoides*), large-fruit amaranth (*Amaranthus deflexus*), mucronate amaranth (*Amaranthus quitensis*), alligator weed (*Alternanthera philoxeroides*), sessile alligator weed (*Alternanthera sessilis*), and perrotleaf (*Alternanthera tenella*), Papaveraceae weeds: common poppy (*Papaver rhoeas*), field poppy (*Papaver dubium*), and Mexican prickle poppy (*Argemone mexicana*), Brassicaceae weeds: wild radish (*Raphanus raphanistrum*), radish (*Raphanus sativus*), wild mustard (*Sinapis

*arvensis*), shepherd's purse (*Capsella bursa-pastoris*), white mustard (*Brassica juncea*), oilseed rape (*Brassica napus*), pinnate tansy mustard (*Descurainia pinnata*), marsh yellowcress (*Rorippa islandica*), yellow fieldcress (*Rorippa sylvestris*), field pennycress (*Thlaspi arvense*), turnip weed (*Myagrum rugosum*), Virginia pepperweed (*Lepidium virginicum*), and slender wartcress (*Coronopus didymus*), Capparaceae weeds: African cabbage (*Cleome affinis*), Fabaceae weeds: Indian joint vetch (*Aeschynomene indica*), zigzag joint vetch (*Aeschynomene rudis*), hemp sesbania (*Sesbania exaltata*), sickle pod (*Cassia obtusifolia*), coffee senna (*Cassia occidentalis*), Florida beggar weed (*Desmodium tortuosum*), wild groundnut (*Desmodium adscendens*), Illinois tick trefoil (*Desmodium illinoense*), white clover (*Trifolium repens*), kudzu (*Pueraria lobate*), narrowleaf vetch (*Vicia angustifolia*), hairy indigo (*Indigofera hirsute*), Indigofera truxillensis, and common cowpea (*Vigna sinensis*), Oxalidaceae weeds: creeping wood sorrel (*Oxalis corniculata*), European wood sorrel (*Oxalis stricta*), and purple shamrock (*Oxalis oxyptera*), Geraniaceae weeds: Carolina geranium (*Geranium carolinense*), and common storksbill (*Erodium cicutarium*), Euphorbiaceae weeds: sun spurge (*Euphorbia helioscopia*), annual spurge (*Euphorbia maculate*), prostrate spurge (*Euphorbia humistrata*), Hungarian spurge (*Euphorbia esula*), wild poinsettia (*Euphorbia heterophylla*), hyssop-leaf sandmat (*Euphorbia brasiliensis*), Asian copperleaf (*Acalypha australis*), tropic croton (*Croton glandulosus*), lobed croton (*Croton lobatus*), long-stalked phyllanthus (*Phyllanthus corcovadensis*), and castor bean (*Ricinus communis*), Malvaceae weeds: velvetleaf (*Abutilon theophrasti*), arrow-leaf sida (*Sida rhombifolia*), heart-leaf sida (*Sida cordifolia*), prickly sida (*Sida spinosa*), *Sida glaziovii, Sida santaremnensis*, bladder weed (*Hibiscus trionum*), spurred anoda (*Anoda cristate*), and spine-seeded false-mallow (*Malvastrum coromandelianum*), Onagraceae weeds: Ludwigia epilobioides, long-fruited primrose willow (*Ludwigia octovalvis*), winged water primrose (*Ludwigia decurrens*), common evening-primrose (*Oenothera biennis*), and cutleaf evening-primrose (*Oenothera laciniata*), Sterculiaceae weeds: Florida waltheria (*Waltheria indica*), Violaceae weeds: field violet; Viola arvensis, wild violet; Viola tricolor, Cucurbitaceae weeds: bur cucumber (*Sicyos angulates*), wild cucumber (*Echinocystis lobata*), and bitter balsam apple (*Momordica charantia*), Lythraceae weeds: Ammannia multiflora, eared redstem (*Ammannia auriculata*), scarlet toothcup (*Ammannia coccinea*), purple loosestrife (*Lythrum salicaria*), and Indian toothcup (*Rotala indica*), Elatinaceae weeds: three-stamen waterwort (*Elatine triandra*), and California waterwort (*Elatine californica*), Apiaceae weeds: Chinese celery (*Oenanthe javanica*), wild carrot (*Daucus carota*), and carrot fern (*Conium maculatum*), Araliaceae weeds: lawn pennywort (*Hydrocotyle sibthorpioides*), and floating pennywort (*Hydrocotyle ranunculoides*), Ceratophyllaceae weeds: common hornwort (*Ceratophyllum demersum*), Cabombaceae weeds: Carolina fanwort (*Cabomba caroliniana*), Haloragaceae weeds: Brazilian water milfoil (*Myriophyllum aquaticum*), whorled water milfoil (*Myriophyllum verticillatum*), and water milfoils (*Myriophyllum spicatum, Myriophyllum heterophyllum*, etc.), Sapindaceae weeds: heartseed (*Cardiospermum halicacabum*), Primulaceae weeds: scarlet pimpernel (*Anagallis arvensis*), Asclepiadaceae weeds: common milkweed (*Asclepias syriaca*), and honeyvine milkweed (*Ampelamus albidus*), Rubiaceae weeds: catchweed bedstraw (*Galium aparine*), *Galium spurium* var. echinospermon, broadleaf buttonweed (*Spermacoce latifolia*), Brazil calla lily (*Richardia brasiliensis*), and broadleaf buttonweed (*Borreria alata*), Convolvulaceae weeds: Japanese morning glory (*Ipomoea nil*), ivy-leaf morning glory (*Ipomoea hederacea*), tall morning glory (*Ipomoea purpurea*), entire-leaf morning glory (*Ipomoea hederacea* var. *integriuscula*), pitted morning glory (*Ipomoea lacunosa*), three-lobe morning glory (*Ipomoea triloba*), blue morning glory (*Ipomoea acuminata*), scarlet morning glory (*Ipomoea hederifolia*), red morning glory (*Ipomoea coccinea*), cypress-vine morning glory (*Ipomoea quamoclit*), *Ipomoea grandifolia, Ipomoea aristolochiaefolia*, Cairo morning glory (*Ipomoea cairica*), field bindweed (*Convolvulus arvensis*), Japanese false bindweed (*Calystegia hederacea*), Japanese bindweed (*Calystegia japonica*), ivy woodrose (*Merremia hederacea*), hairy woodrose (*Merremia aegyptia*), roadside woodrose (*Merremia cissoides*), and small-flower morning glory (*Jacquemontia tamnifolia*), Boraginaceae weeds: field forget-me-not (*Myosotis arvensis*), Lamiaceae weeds: purple deadnettle (*Lamium purpureum*), common henbit (*Lamium amplexicaule*), lion's ear (*Leonotis nepetaefolia*), wild spikenard (*Hyptis suaveolens*), Hyptis lophanta, Siberian motherwort (*Leonurus sibiricus*), and field-nettle betony (*Stachys arvensis*), Solanaceae weeds: jimsonweed (*Datura stramonium*), black nightshade (*Solanum nigrum*), American black nightshade (*Solanum americanum*), eastern black nightshade (*Solanum ptycanthum*), hairy nightshade (*Solanum sarrachoides*), buffalo bur (*Solanum rostratum*), soda-apple nightshade (*Solanum aculeatissimum*), sticky nightshade (*Solanum sisymbriifolium*), horse nettle (*Solanum carolinense*), cutleaf groundcherry (*Physalis angulata*), smooth groundcherry (*Physalis subglabrata*), and apple of Peru (*Nicandra physalodes*), Scrophulariaceae weeds: ivyleaf speedwell (*Veronica hederaefolia*), common speedwell (*Veronica persica*), corn speedwell (*Veronica arvensis*), common false pimpernel (*Lindernia procumbens*), false pimpernel (*Lindernia dubia*), *Lindernia angustifolia*, round-leaf water hyssop (*Bacopa rotundifolia*), dopatrium (*Dopatrium junceum*), and *Gratiola japonica,*

Plantaginaceae weeds: Asiatic plantain (*Plantago asiatica*), narrow-leaved plantain (*Plantago lanceolata*), broadleaf plantain (*Plantago major*), and marsh water starwort (*Callitriche palustris*), Asteraceae weeds: common cocklebur (*Xanthium pensylvanicum*), large cocklebur (*Xanthium occidentale*), Canada cocklebur (*Xanthium italicum*), common sunflower (*Helianthus annuus*), wild chamomile (*Matricaria chamomilla*), scentless chamomile (*Matricaria perforata*), corn marigold (*Chrysanthemum segetum*), rayless mayweed (*Matricaria matricarioides*), Japanese mugwort (*Artemisia princeps*), common mugwort (*Artemisia vulgaris*), Chinese mugwort (*Artemisia verlotorum*), tall goldenrod (*Solidago altissima*), common dandelion (*Taraxacum officinale*), hairy galinsoga (*Galinsoga ciliata*), small-flower galinsoga (*Galinsoga parviflora*), common groundsel (*Senecio vulgaris*), flower-of-souls (*Senecio brasiliensis*), *Senecio grisebachii*, fleabane (*Conyza bonariensis*), *Guernsey fleabane* (*Conyza sumatrensis*), marestail (*Conyza canadensis*), common ragweed (*Ambrosia artemisiifolia*), giant ragweed (*Ambrosia trifida*), three-cleft bur-marigold (*Bidens tripartita*), hairy beggarticks (*Bidens pilosa*), common beggarticks (*Bidens frondosa*), greater beggarticks (*Bidens subalternans*), Canada thistle (*Cirsium arvense*), black thistle (*Cirsium vulgare*), blessed milkthistle (*Silybum marianum*), musk thistle (*Carduus nutans*), prickly lettuce (*Lactuca serriola*), annual sowthistle (*Sonchus oleraceus*), spiny sowthistle (*Sonchus asper*), beach creeping oxeye (*Wedelia glauca*), perfoliate blackfoot (*Melampodium perfoliatum*), red tasselflower (*Emilia sonchifolia*), wild marigold (*Tagetes minuta*), para cress (*Blainvillea latifolia*), coat buttons (*Tridax procumbens*), Bolivian coriander (*Porophyllum ruderale*), Paraguay starbur (*Acanthospermum australe*), bristly starbur (*Acanthospermum hispidum*), balloon vine (*Cardiospermum halicacabum*), tropic ageratum (*Ageratum conyzoides*), common boneset (*Eupatorium perfoliatum*), fireweed (*Erechtites hieracifolia*), American cudweed (*Gamochaeta spicata*), linear-leaf cudweed (*Gnaphalium spicatum*), Jaegeria hirta, ragweed parthenium (*Parthenium hysterophorus*), small yellow crownbeard (*Siegesbeckia orientalis*), lawn burweed (*Soliva sessilis*), white eclipta (*Eclipta prostrata*), American false daisy (*Eclipta alba*), and spreading sneezeweed (*Centipeda minima*), Alismataceae weeds: dwarf arrowhead (*Sagittaria pygmaea*), threeleaf arrowhead (*Sagittaria trifolia*), arrowhead (*Sagittaria sagittifolia*), giant arrowhead (*Sagittaria montevidensis*), Sagittaria aginashi, channelled water plantain (*Alisma canaliculatum*), and common water plantain (*Alisma plantago-aquatica*), Limnocharitaceae weeds: Sawah flowering rush (*Limnocharis flava*), Hydrocharitaceae weeds: American frogbit (*Limnobium spongia*), Florida elodea (*Hydrilla verticillata*), and common water nymph (*Najas guadalupensis*), Araceae weeds: Nile cabbage (*Pistia stratiotes*), Lemnaceae weeds: three-nerved duckweed (*Lemna aoukikusa, Lemna paucicostata, Lemna aequinoctialis*), common duckmeat (*Spirodela polyrhiza*), and *Wolffia* spp., Potamogetonaceae weeds: roundleaf pondweed (*Potamogeton distinctus*), and pondweeds (*Potamogeton crispus, Potamogeton illinoensis, Stuckenia pectinata*, etc.), Liliaceae weeds: wild onion (*Allium canadense*), wild garlic (*Allium vineale*), and Chinese garlic (*Allium macrostemon*), Pontederiaceae weeds: common water hyacinth (*Eichhornia crassipes*), blue mud plantain (*Heteranthera limosa*), Monochoria korsakowii, and heartshape false pickerelweed (*Monochoria vaginalis*), Commelinaceae weeds: common dayflower (*Commelina communis*), tropical spiderwort (*Commelina benghalensis*), erect dayflower (*Commelina erecta*), and Asian spiderwort (*Murdannia keisak*), Poaceae weeds: common barnyardgrass (*Echinochloa crus-galli*), early barnyardgrass (*Echinochloa oryzicola*), barnyard grass (*Echinochloa crus-galli* var *formosensis*), late watergrass (*Echinochloa oryzoides*), jungle rice (*Echinochloa colonum*), Gulf cockspur (*Echinochloa crus-pavonis*), green foxtail (*Setaria viridis*), giant foxtail (*Setaria faberi*), yellow foxtail (*Setaria glauca*), knotroot foxtail (*Setaria geniculata*), southern crabgrass (*Digitaria ciliaris*), large crabgrass (*Digitaria sanguinalis*), Jamaican crabgrass (*Digitaria horizontalis*), sourgrass (*Digitaria insularis*), goosegrass (*Eleusine indica*), annual bluegrass (*Poa annua*), rough-stalked meadowgrass (*Poa trivialis*), Kentucky bluegrass (*Poa pratensis*), short-awn foxtail (*Alopecurus aequalis*), blackgrass (*Alopecurus myosuroides*), wild oat (*Avena fatua*), Johnsongrass (*Sorghum halepense*), shataken (grain sorghum; *Sorghum vulgare*), quackgrass (*Agropyron repens*), Italian ryegrass (*Lolium multiflorum*), perennial ryegrass (*Lolium perenne*), bomugi (rigid ryegrass; *Lolium rigidum*), rescue brome (*Bromus catharticus*), downy brome (*Bromus tectorum*), Japanese brome grass (*Bromus japonicus*), cheat (*Bromus secalinus*), cheatgrass (*Bromus tectorum*), foxtail barley (*Hordeum jubatum*), jointed goatgrass (*Aegilops cylindrica*), reed canarygrass (*Phalaris arundinacea*), little-seed canary grass (*Phalaris minor*), silky bentgrass (*Apera spica-venti*), fall panicum (*Panicum dichotomiflorum*), Texas panicum (*Panicum texanum*), guineagrass (*Panicum maximum*), broadleaf signalgrass (*Brachiaria platyphylla*), Congo signal grass (*Brachiaria ruziziensis*), Alexander grass (*Brachiaria plantaginea*), Surinam grass (*Brachiaria decumbens*), palisade grass (*Brachiaria brizantha*), creeping signalgrass (*Brachiaria humidicola*), southern sandbur (*Cenchrus echinatus*), field sandbur (*Cenchrus pauciflorus*), woolly cupgrass (*Eriochloa villosa*), feathery pennisetum (*Pennisetum setosum*), Rhodes grass (*Chloris gayana*), feathertop Rhodes grass (*Chloris virgata*), India lovegrass (*Eragrostis pilosa*), Natal grass (*Rhynchelytrum repens*), crowfoot grass (*Dactyloctenium aegyptium*), winkle grass (*Ischaemum rugosum*), swamp millet (*Isachne globosa*), common rice (*Oryza sativa*), bahiagrass (*Paspalum notatum*), coastal sand paspalum (*Paspalum maritimum*), mercergrass (*Paspalum distichum*), kikuyugrass (*Pennisetum clandestinum*), West Indies pennisetum (*Pennisetum setosum*), itch grass (*Rottboellia cochinchinensis*), Asian sprangletop (*Leptochloa chinensis*), salt-meadow grass (*Leptochloa fascicularis*), Christmas-tree grass (*Leptochloa filiformis*), Amazon sprangletop (*Leptochloa panicoides*), Japanese cutgrass (*Leersia japonica*), Leersia sayanuka, cutgrass (*Leersia oryzoides*), *Glyceria leptorrhiza*, sharpscale mannagrass (*Glyceria acutiflora*), great watergrass (*Glyceria maxima*), redtop (*Agrostis gigantea*), carpet bent (*Agrostis stolonifera*), Bermuda grass (*Cynodon dactylon*), cocksfoot (*Dactylic glomerata*), centipede grass (*Eremochloa ophiuroides*), tall fescue (*Festuca arundinacea*), red fescue (*Festuca rubra*), lalang (*Imperata cylindrica*), Chinese fairy grass (*Miscanthus sinensis*), switchgrass (*Panicum virgatum*), and Japanese lawngrass (*Zoysia japonica*), Cyperaceae weeds: Asian flatsedge (*Cyperus microiria*), rice flatsedge (*Cyperus iria*), hedgehog cyperus (*Cyperus compressus*), small-flowered nutsedge (*Cyperus difformis*), lax-flat sedge (*Cyperus flaccidus*), *Cyperus globosus, Cyperus nipponicus*, fragrant flatsedge (*Cyperus odoratus*), mountain nutsedge (*Cyperus serotinas*), purple nutsedge (*Cyperus rotundus*), yellow nutsedge (*Cyperus esculentus*), pasture spike sedge (*Kyllinga gracillima*), green kyllinga (*Kyllinga brevifolia*), grasslike fimbristylis (*Fimbristylis miliacea*), annual fringerush (*Fimbristylis dichotoma*), slender spikerush (*Eleocharis acicularis*), *Eleocharis kurogu-wai*, Japanese bulrush (*Schoenoplectiella hotarui*), hardstem bulrush (*Schoenoplectiella juncoides*), *Schoenoplectiella wallichii*, rough-seed bulrush (*Schoenoplectiella mucronatus*), *Schoenoplectiella triangulates, Schoenoplectiella nipponicus*, triangular club-rush (*Schoenoplectiella triqueter*), *Bolboschoenus koshevnikovii*, and river bulrush (*Bolboschoenus fluviatilis*), Equisetaceae weeds: field horsetail (*Equisetum arvense*), and marsh horsetail (*Equisetum palustre*), Salviniaceae weeds: floating fern (*Salvinia natans*), Azollaceae weeds: Japanese mosquitofern (*Azolla japonica*), and feathered mosquito fern (*Azolla pinnata*), Marsileaceae weeds: clover fern (*Marsilea quadrifolia*), Other: Filamentous algae (*Pithophora, Cladophora*), *Bryophyta, Marchantiophyta, Anthocerotophyta, Cyanobacteria, Pteridophyta*, and sucker of perennial crop (pome fruits, stone fruits, berry fruits, nuts, citrus fruits, hops, grapes, etc.).

In the above weeds, mutations within the species are not particularly limited. Namely, the weeds may have both traits of reduced sensitivity and resistance to specific herbicides. The reduced sensitivity and resistance may be attributed to target site mutation, i.e., mutation occurs at a target site, or may be attributed to non-target site mutation. Examples of the non-target site mutation include metabolic enhancement, defective absorption, defective transition, efflux out of the system and the like. Examples of the factor of the metabolic enhancement include enhanced activity of metabolic enzymes such as cytochrome P450 monooxygenases, aryl acylamidases, esterases and glutathione S-transferase. The efflux out of the system includes the transportation to a vacuole by an ABC transporter.

Examples of the target site mutation include the substitution of one amino acid residue or multiple amino acid residues selected from the below-mentioned amino acid residues in ALS gene.

Ala122Thr, Ala122Val, Ala122Tyr, Pro197Ser, Pro197His, Pro197Thr, Pro197Arg, Pro197Leu, Pro197Gln, Pro197Ala, Pro197Ile, Ala205Val, Ala205Phe, Asp376Glu, Arg377His, Trp574Leu, Trp574Gly, Trp574Met, Ser653Thr, Ser653Thr, Ser653Asn, Ser635Ile, Gly654Glu and Gly645Asp.

Examples of the reduced sensitivity of weeds due to target site mutation include reduced sensitivity due to the substitution of one amino acid residue or multiple amino acid residues selected from the below-mentioned amino acid residues in ACCase gene.

Ile1781Leu, Ile1781Val, Ile1781Thr, Trp1999Cys, Trp1999Leu, Ala2004Val, Trp2027Cys, Ile2041Asn, Ile2041Val, Asp2078Gly, Cys2088Arg and Gly2096Ala.

Similarly, examples of the reduced sensitivity of weeds due to target site mutation include the substitution of amino acid residues such as Thr102Ile, Pro106Ser, Pro106Ala, Pro106Leu and Pro106Thr in EPSP gene. Particularly, those with substitution of amino acid residues of both of Thr102Ile and Pro106Ser, and those with substitution of amino acid residues of both of Thr102Ile and Pro106Thr are mentioned. Glyphosate-resistant goosegrass (*Eleusine indica*), Italian ryegrass (*Lolium multiflorum*), rigid ryegrass (*Lolium rigidum*), perennial ryegrass, sourgrass (*Digitaria insularis*), waterhemp (*Amaranthus tuberculatus=Amaranthus rudis=Amaranthus tamariscinus*), *Bidens subalternans*, jungle rice (*Echinochloa colona*) and the like each having substitution of one amino acid residue or multiple amino acid residues among the above-mentioned amino acid residues can be controlled effectively. Similarly, examples of the reduced sensitivity of weeds due to target site mutation include glyphosate-resistant palmer amaranth (*Amaranthus palmeri*), waterhemp (*Amaranthus tuberculatus=Amaranthus rudis=Amaranthus tamariscinus*), summer cypress (*Bassia scoparia*) and the like in which the number of copies of EPSP gene is increased (PNAS, 2018 115 (13) 3332-3337) and each having mutation thereof can also be controlled effectively. Glyphosate-resistant Canadian horseweed (*Conyza canadensis*), Sumatran fleabane (*Conyza sumatrensis*) and flax-leaf fleabane (*Conyza bonariensis*) in which an ABC transporter is involved can also be controlled effectively. Furthermore, jungle rice (*Echinochloa colona*) in which sensitivity to glyphosate is reduced by increasing expression of aldo-keto reductase known as non-target site mutation (Plant Physiology 181, 1519-1534) is effectively controlled.

Weeds which can be controlled by the present composition or the present method may have substitution of one amino acid residue or multiple amino acid residues selected from the group consisting of Arg128Leu, Arg128Met, Arg128Gly, Arg128His, Arg128Ala, Arg128Cys, Arg128Glu, Arg128Ile, Arg128Lys, Arg128Asn, Arg128Gln, Arg128Ser, Arg128Thr, Arg128Val, Arg128Tyr, Gly210 deletion, Ala210 deletion, Gly210Thr, Ala210Thr, G211 deletion, Gly114Glu, Ser149Ile and Gly399Ala (all of amino acid numbers are standardized by sequence of PPO2 of palmer amaranth (*Amaranthus palmeri*)) in PPO as target site mutation. These target site mutations are known as or predicted to become carfentrazone-ethyl-, fomesafen- and lactofen-resistance mutations. PPO means protoporphyrinogen oxidase. PPO in a weed includes PPO1 and PPO2. The above-mentioned mutation may occur in either one or both of PPO1 and PPO2. It is preferred that the mutation occurs in PPO2.

For example, Arg128Met means that a mutation occurs in an amino acid residue located at position-128. Common ragweed (*Ambrosia artemisiifolia*) having a mutation corresponding to Arg128Leu in PPO2 (common ragweed (*Ambrosia artemisiifolia*) having an Arg98Leu mutation in PPO2) is known (Weed Science 60, 335-344). Palmer amaranth (*Amaranthus palmeri*) having an Arg128Met mutation in PPO2 is known (Pest Management Science 73, 1559-1563). Palmer amaranth (*Amaranthus palmeri*) having an Arg128Gly mutation in PPO2 is known (Pest Management Science 73, 1559-1563). Waterhemp (*Amaranthus tuberculatus=Amaranthus rudis=Amaranthus tamariscinus*) having an Arg128Gly mutation in PPO2 is known (Pest Management Science, doi: 10.1002/ps.5445). Waterhemp (*Amaranthus tuberculatus=Amaranthus rudis=Amaranthus tamariscinus*) having an Arg128Ile mutation in PPO2 and waterhemp (*Amaranthus tuberculatus=Amaranthus rudis Amaranthus tamariscinus*) having an Arg128Lys mutation in PPO2 are respectively known (Pest Management Science, doi: 10.1002/ps.5445). Rigid ryegrass (*Lolium rigidum*) having a mutation corresponding to Arg128His in PPO2 (rigid ryegrass (*Lolium rigidum*) having an Arg132His mutation in PPO2) is known. Gly114Glu, Ser149Ile and Gly399Ala are known to exist in PPO2 of palmer amaranth (*Amaranthus palmeri*) (Frontiers in Plant Science 10, Article 568). Goosegrass (*Eleusine indica*) having a mutation corresponding to Ala210Thr in PPO1 (goosegrass (*Eleusine indica*) having an Ala212Thr mutation in PPO1) is known (WSSA annual meeting, 2019). According to the present composition or the present method, PPO inhibitor-resistant weeds each having one of the above-mentioned target site mutations can be controlled effectively. However, the PPO inhibitor-resistant weeds to be controlled is not limited to these weeds. Namely, not only palmer amaranth (*ranthus palmeri*aving one mutation or multiple mutations selected from the group consisting of Arg128Leu, Arg128Met, Arg128Gly, Arg128His, Arg128Ala, Arg128Cys, Arg128Glu, Arg128Ile, Arg128Lys, Arg128Asn, Arg128Gln, Arg128Ser, Arg128Thr, Arg128Val, Arg128Tyr, Gly210 deletion, Ala210 deletion, Gly210Thr, Ala210Thr, G211 deletion, Gly114Glu, Ser19Ile and Gly399Ala in either PPM_ or PPO2 or both of them but also, for example, waterhemp (*Amaranthus tuberculatus*=*Amaranthus rudis*=*Amaranthus tamariscinus*) having the same mutation, common ragweed (*Ambrosia artemisiifolia*) having the same mutation, rigid ryegrass (*Lolium rigidum*) having the same mutation, Italian ryegrass (*Lolium multiflorum*) having the same mutation and wild poinsettia (*Euphorbia cyathophora*) having the same mutation can be controlled effectively.

Weeds which can be controlled by the present composition or the present method may be herbicide-resistant weeds due to non-target site mutation. Examples of the reduced sensitivity of weeds due to non-target site mutation include waterhemp (*Amaranthus tuberculatus*=*Amaranthus rudis*=*Amaranthus tamariscinus*) and palmer amaranth (*Amaranthus palmeri*) which become resistant to a PPO inhibitor as the result of the involvement of CYP or GST, and specifically, waterhemp (*Amaranthus tuberculatus*=*Amaranthus rudis*=*Amaranthus tamariscinus*) which becomes resistant to carfentrazone-ethyl is known (PLOS ONE, doi: 10.1371/journal.pone.0215431). These weeds are effectively controlled according to the present composition or the present method.

In the cultivation of a crop in the present invention, a plant-nutritional management in a common crop cultivation can be carried out. A fertilization system may be one based on Precision Agriculture, or may be a conventional homogeneous one. Alternatively, a nitrogen-fixing bacterium or a mycorrhizal fungus may be inoculated together with a seed treatment.

EXAMPLES

Hereinbelow, the present invention will be described in more detail by way of Examples. However, the present invention is not limited by these Examples.

At first, criteria for the evaluation of the herbicidal effect and the harmful effect on crops shown in the below-mentioned examples will be described.

[Herbicidal Effect and Harmful Effect on Crops]

The herbicidal effect was rated within a range of 0 to 100, wherein "0" was a rating where the state of emergence or growth of a sample weed during a test had no difference or little difference compared with the state of the test weed that did not subjected to the treatment, and "100" was a rating where the test plant was completely killed or the emergence or growth of the test weed was completely suppressed.

The harmful effect on crops was rated as "harmless" when little harmful effect was observed, "low" when a moderate level of harmful effect was observed, "medium" when a medium level of harmful effect was observed, and "high" when a high level of harmful effect was observed.

Example 1

The weeds (palmer amaranth (*Amaranthus palmeri*), waterhemp (*Amaranthus tuberculatus*=*Amaranthus rudis*=*Amaranthus tamariscinus*), common ragweed (*Ambrosia artemisiifolia*), giant ragweed (*Ambrosia trifida*), Canadian horseweed (*Conyza canadensis*), common lambsquarters (*Chenopodium album*), summer cypress (*Bassia scoparia*), common barnyardgrass (*Echinochloa crus-galli*) and giant foxtail (*Setaria faberi*)) are seeded in a plastic pot. On the same day, a spray liquid containing the compound X and pyroxasulfone prepared so that the application rate of the compound X might be 25, 50, 100 or 200 g/ha and the application rate of ZIDUA (pyroxasulfone 85% water dispersible granule, manufactured by BASF SE) might be 70, 140 or 280 g/ha (1, 2 or 4 ounce/acre) is applied to the surface of soil so that the spray liquid amount may be 200 L/ha. The weeds are then cultivated in a greenhouse, and at 7 days after the application, soybeans are seeded. Fourteen days after seeding the soybeans, the effect on the weeds and crop injuries on the soybeans are investigated. A synergistic weed control effect compared to the single use of each of the compounds is confirmed.

Example 2

The weeds (palmer amaranth (*Amaranthus palmeri*), waterhemp (*Amaranthus tuberculatus*=*Amaranthus rudis*=*Amaranthus tamariscinus*), common ragweed (*Ambrosia artemisiifolia*), giant ragweed (*Ambrosia trifida*), Canadian horseweed (*Conyza canadensis*), common lambsquarters (*Chenopodium album*), summer cypress (*Bassia scoparia*), common barnyardgrass (*Echinochloa crus-galli*) and giant foxtail (*Setaria faberi*)) and soybeans are seeded in a plastic pot. On the same day, a spray liquid containing the compound X and saflufenacil prepared so that the application rate of the compound X might be 25, 50, 100 or 200 g/ha and the application rate of Sharpen (saflufenacil 29.7% wettable powder, manufactured by BASF SE) might be 73 mL/ha (1 fluid ounce/acre) is applied to the surface of soil so that the spray liquid amount may be 200 L/ha. The weeds and soybeans are then cultivated in a greenhouse, and 21 days after the application, the effect on the weeds and crop injuries on soybeans are investigated. A synergistic weed control effect compared to the single use of each of the compounds is confirmed.

Example 3

The weeds (palmer amaranth (*Amaranthus palmeri*), waterhemp (*Amaranthus tuberculatus*=*Amaranthus rudis Amaranthus tamariscinus*), common ragweed (*Ambrosia artemisiifolia*), giant ragweed (*Ambrosia trifida*), Canadian horseweed (*Conyza canadensis*), common lambsquarters (*Chenopodium album*), summer cypress (*Bassia scoparia*), common barnyardgrass (*Echinochloa crus-galli*) and giant foxtail (*Setaria faberi*)) and soybeans are seeded in a plastic pot. On the same day, a spray liquid containing the compound X and flumioxazin prepared so that the application rate of the compound X might be 25, 50, 100 or 200 g/ha and the application rate of Valor SX (flumioxazin 51% wettable powder, manufactured by Valent U.S.A. LLC) might be 140 g/ha (2 ounce/acre) is applied to the surface of soil so that the spray liquid amount may be 200 L/ha. The weeds and soybeans are then cultivated in a greenhouse, and 21 days after the application, the effect on the weeds and crop injuries on soybeans are investigated. A synergistic weed control effect compared to the single use of each of the compounds is confirmed.

Examples 4 to 6

The application is performed in the same manner, except that soybean of Examples 1 to 3 is replaced by corn or cotton. A synergistic weed control effect compared to the single use of each of the compounds is confirmed.

Example 7

The weeds (palmer amaranth (*Amaranthus palmeri*), waterhemp (*Amaranthus tuberculatus*=*Amaranthus rudis*=*Amaranthus tamariscinus*), common ragweed (*Am-

*brosia artemisiifolia*), giant ragweed (*Ambrosia trifida*), Canadian horseweed (*Conyza canadensis*), common lambsquarters (*Chenopodium album*), summer cypress (*Bassia scoparia*), common barnyardgrass (*Echinochloa crus-galli*) and giant foxtail (*Setaria faberi*)) are seeded in a plastic pot. The weeds are then cultivated in a greenhouse, and 21 days after the seeding, a spray liquid containing the compound X and glyphosate-potassium salt prepared so that the application rate of the compound X might be 25, 50, 100 or 200 g/ha and the application rate of RoundupWeatherMax (660 g/L of glyphosate-potassium salt, manufactured by Monsanto Company) might be 2.338 L/ha (32 fluid ounce/acre) is applied to the foliage so that the spray liquid amount may be 200 L/ha. The weeds are further cultivated in a greenhouse, and 7 days and 14 days after the application, the effect on the weeds are investigated. A synergistic weed control effect compared to the single use of each of the compounds is confirmed.

Example 8

The weeds (palmer amaranth (*Amaranthus palmeri*), waterhemp (*Amaranthus tuberculatus*=*Amaranthus rudis*=*Amaranthus tamariscinus*), common ragweed (*Ambrosia artemisiifolia*), giant ragweed (*Ambrosia trifida*), Canadian horseweed (*Conyza canadensis*), common lambsquarters (*Chenopodium album*), summer cypress (*Bassia scoparia*), common barnyardgrass (*Echinochloa crus-galli*) and giant foxtail (*Setaria faberi*)) are seeded in a plastic pot. On the same day, a spray liquid containing the compound X prepared so that the application rate of the compound X might be 25, 50, 100 or 200 g/ha is applied to the surface of soil so that the spray liquid amount may be 200 L/ha. The weeds are then cultivated in a greenhouse, and at 7 days after the application, soybeans are seeded. A spray liquid containing pyroxasulfone prepared so that the application rate of ZIDUA (pyroxasulfone 85% water dispersible granule, manufactured by BASF SE) might be 70, 140 or 280 g/ha (1, 2 or 4 ounce/acre) is applied so that the spray liquid amount may be 200 L/ha. Fourteen days after the application, the effect on the weeds and crop injuries on soybeans are investigated. A synergistic weed control effect compared to the single use of each of the compounds is confirmed.

Example 9

The weeds (palmer amaranth (*Amaranthus palmeri*), waterhemp (*Amaranthus tuberculatus*=*Amaranthus rudis Amaranthus tamariscinus*), common ragweed (*Ambrosia artemisiifolia*), giant ragweed (*Ambrosia trifida*), Canadian horseweed (*Conyza canadensis*), common lambsquarters (*Chenopodium album*), summer cypress (*Bassia scoparia*), common barnyardgrass (*Echinochloa crus-galli*) and giant foxtail (*Setaria faberi*)) are seeded in a plastic pot. On the same day, a spray liquid containing the compound X prepared so that the application rate of the compound X might be 25, 50, 100 or 200 g/ha is applied to the surface of soil so that the spray liquid amount may be 200 L/ha. The weeds are then cultivated in a greenhouse, and at 7 days after the application, soybeans are seeded. A spray liquid containing saflufenacil prepared so that the application rate of Sharpen (saflufenacil 29.7% wettable powder, manufactured by BASF SE) might be 73 mL/ha (1 fluid ounce/acre) is applied so that the spray liquid amount may be 200 L/ha. Fourteen days after the application, the effect on the weeds and crop injuries on soybeans are investigated. A synergistic weed control effect compared to the single use of each of the compounds is confirmed.

Example 10

The weeds (palmer amaranth (*Amaranthus palmeri*), waterhemp (*Amaranthus tuberculatus*=*Amaranthus rudis*=*Amaranthus tamariscinus*), common ragweed (*Ambrosia artemisiifolia*), giant ragweed (*Ambrosia trifida*), Canadian horseweed (*Conyza canadensis*), common lambsquarters (*Chenopodium album*), summer cypress (*Bassia scoparia*), common barnyardgrass (*Echinochloa crus-galli*) and giant foxtail (*Setaria faberi*)) are seeded in a plastic pot. On the same day, a spray liquid containing the compound X prepared so that the application rate of the compound X might be 25, 50, 100 or 200 g/ha is applied to the surface of soil so that the spray liquid amount may be 200 L/ha. The weeds are then cultivated in a greenhouse, and at 7 days after the application, soybeans are seeded. A spray liquid containing flumioxazin prepared so that the application rate of Valor SX (flumioxazin 51% wettable powder, manufactured by Valent U.S.A. LLC) might be 140 g/ha (2 ounce/acre) is applied so that the spray liquid amount may be 200 L/ha. Fourteen days after the application, the effect on the weeds and crop injuries on soybeans are investigated. A synergistic weed control effect compared to the single use of each of the compounds is confirmed.

Examples 11 to 13

In each test of Examples 8 to 10, RoundupPowerMax (660 g/L of glyphosate-potassium salt, manufactured by Monsanto Company) is further added to the compound X so that the application rate may be 2.338 L/ha (32 fluid ounce/acre, 1,543 g/ha as glyphosate-potassium salt), followed by application in the same manner. A synergistic weed control effect compared to the single use of each of the compounds is confirmed.

Example 14

The weeds (palmer amaranth (*Amaranthus palmeri*), waterhemp (*Amaranthus tuberculatus*=*Amaranthus rudis Amaranthus tamariscinus*), common ragweed (*Ambrosia artemisiifolia*), giant ragweed (*Ambrosia trifida*), Canadian horseweed (*Conyza canadensis*), common lambsquarters (*Chenopodium album*), summer cypress (*Bassia scoparia*), common barnyardgrass (*Echinochloa crus-galli*) and giant foxtail (*Setaria faberi*)) are seeded in a plastic pot. On the same day, a spray liquid containing the compound X prepared so that the application rate of the compound X might be 25, 50, 100 or 200 g/ha is applied to the surface of soil so that the spray liquid amount may be 200 L/ha. The weeds are then cultivated in a greenhouse, and at 7 days after the application, soybeans are seeded. Fourteen days after seeding the soybeans, a spray liquid containing glyphosate-potassium salt prepared so that the application rate of RoundupWeatherMax (660 g/L of glyphosate-potassium salt, manufactured by Monsanto Company) might be 2.338 L/ha (32 fluid ounce/acre) is applied so that the spray liquid amount may be 200 L/ha. Fourteen days after the application (28 days after the seeding), the effect on the weeds and crop injuries on soybeans are investigated. A synergistic weed control effect compared to the single use of each of the compounds is confirmed.

Example 15

In the application of the compound X of Example 14, RoundupPowerMax (660 g/L of glyphosate-potassium salt, manufactured by Monsanto Company) is further added so that the application rate may be 2.338 L/ha (32 fluid ounce/acre, 1,543 g/ha as glyphosate-potassium salt), followed by application in the same manner. A synergistic weed control effect compared to the single use of each of the compounds is confirmed.

Examples 16 to 23

The application is performed in the same manner, except that soybean of Examples 8 to 15 is replaced by corn or cotton.

Examples 24 to 46

The application is performed in the same manner, except that the compound X of Examples 1 to 23 is replaced by the compound Y. A synergistic weed control effect compared to the single use of each of the compounds is confirmed.

Examples 47 to 92

The application is performed in the same manner, except that the crop in Examples 1 to 46 is replaced by crops with Roundup Ready 2 Xtend trait. A synergistic weed control effect compared to the single use of each of the compounds is confirmed.

Examples 93 to 138

The application is performed in the same manner, except that the crop in Examples 1 to 46 is replaced by crops produced by a transgenic technique having both Roundup Ready 2 Xtend trait and trait having tolerance to a PPO inhibitor due to having exogenous PPO in which the affinity to a PPO inhibitor to be applied is lower than endogenous PPO in crops. A synergistic weed control effect compared to the single use of each of the compounds is confirmed.

INDUSTRIAL APPLICABILITY

The present composition and the present method can be used for controlling weeds effectively.

The invention claimed is:

1. A herbicidal composition comprising a uracil compound represented by the following formula (I):

(I)

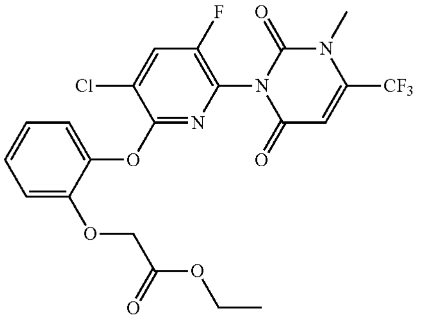

and a herbicide compound group B, wherein the weight ratio of the uracil compound to the herbicide compound group B is from 1:5 to 1:20, and wherein the herbicide compound group B is at least one selected from the group consisting of glufosinate, glufosinate-P, and an agriculturally acceptable salt thereof.

2. The herbicidal composition according to claim 1, comprising a carrier.

* * * * *